(12) United States Patent
Yokokawa et al.

(10) Patent No.: US 9,025,237 B2
(45) Date of Patent: May 5, 2015

(54) ELECTROPHORESIS PARTICLE, METHOD OF MANUFACTURING ELECTROPHORESIS PARTICLE, ELECTROPHORESIS DISPERSION LIQUID, ELECTROPHORESIS SHEET, ELECTROPHORESIS DEVICE AND ELECTRONIC APPARATUS

(71) Applicant: Seiko Epson Corporation, Tokyo (JP)

(72) Inventors: Shinobu Yokokawa, Okaya (JP); Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 134 days.

(21) Appl. No.: 13/848,258

(22) Filed: Mar. 21, 2013

(65) Prior Publication Data

US 2013/0265633 A1 Oct. 10, 2013

(30) Foreign Application Priority Data

Apr. 5, 2012 (JP) ................. 2012-086881

(51) Int. Cl.
| | |
|---|---|
| G02B 26/00 | (2006.01) |
| G03B 17/04 | (2006.01) |
| G02F 1/00 | (2006.01) |
| G02F 1/167 | (2006.01) |
| C09B 67/08 | (2006.01) |
| C09B 67/46 | (2006.01) |

(52) U.S. Cl.
CPC .............. *G02F 1/0081* (2013.01); *G02F 1/167* (2013.01); *G02F 2001/1678* (2013.01); *C09B 67/0013* (2013.01); *C09B 67/009* (2013.01)

(58) Field of Classification Search
USPC .............. 359/290–298; 345/107; 430/30–33
See application file for complete search history.

(56) References Cited

U.S. PATENT DOCUMENTS

| | | | |
|---|---|---|---|
| 4,268,456 A | 5/1981 | Keim et al. | |
| 5,336,581 A | 8/1994 | Inaba et al. | |
| 7,252,883 B2 * | 8/2007 | Wakiya et al. | ................ 428/403 |
| 7,525,719 B2 * | 4/2009 | Yakushiji et al. | ............. 359/296 |
| 7,646,530 B2 * | 1/2010 | Takagi et al. | ................ 359/296 |
| 2003/0206330 A1 | 11/2003 | Nomoto et al. | |
| 2006/0245037 A1 | 11/2006 | Yamamoto et al. | |
| 2007/0195402 A1 * | 8/2007 | Miyazawa | ................... 359/296 |
| 2009/0062462 A1 | 3/2009 | Miyabayashi | |

FOREIGN PATENT DOCUMENTS

| | | |
|---|---|---|
| JP | B-46-34898 | 10/1971 |
| JP | B-49-46291 | 12/1974 |
| JP | A-51-30284 | 3/1976 |
| JP | A-55-11525 | 1/1980 |
| JP | A-62-34947 | 2/1987 |
| JP | A-62-104802 | 5/1987 |
| JP | A-62-221431 | 9/1987 |
| JP | B2-1-24142 | 5/1989 |
| JP | B2-4-65824 | 10/1992 |

(Continued)

*Primary Examiner* — Mohammed Hasan
(74) *Attorney, Agent, or Firm* — Oliff PLC

(57) ABSTRACT

An electrophoresis particle of the embodiment includes a mother particle and a covering layer which covers at least a part of the mother particle, wherein the covering layer includes a shell which is consisted of an organic polymer and which cellulary engulfs the mother particle and a polymer which is bonded on the surface of the shell and the polymer is one that a monomer has been polymerized using living radical polymerization, setting the polymerization initiating group as the starting point.

16 Claims, 10 Drawing Sheets

(56) References Cited

FOREIGN PATENT DOCUMENTS

| | | |
|---|---|---|
| JP | A-5-61237 | 3/1993 |
| JP | A-5-320276 | 12/1993 |
| JP | A-10-316909 | 12/1998 |
| JP | A-2003-15168 | 1/2003 |
| JP | A-2003-66494 | 3/2003 |
| JP | WO2006/043571 A1 | 4/2006 |
| JP | A-2006-201617 | 8/2006 |
| JP | A-2006-323363 | 11/2006 |
| JP | A-2007-225732 | 9/2007 |
| JP | A-2010-2586 | 1/2010 |

* cited by examiner

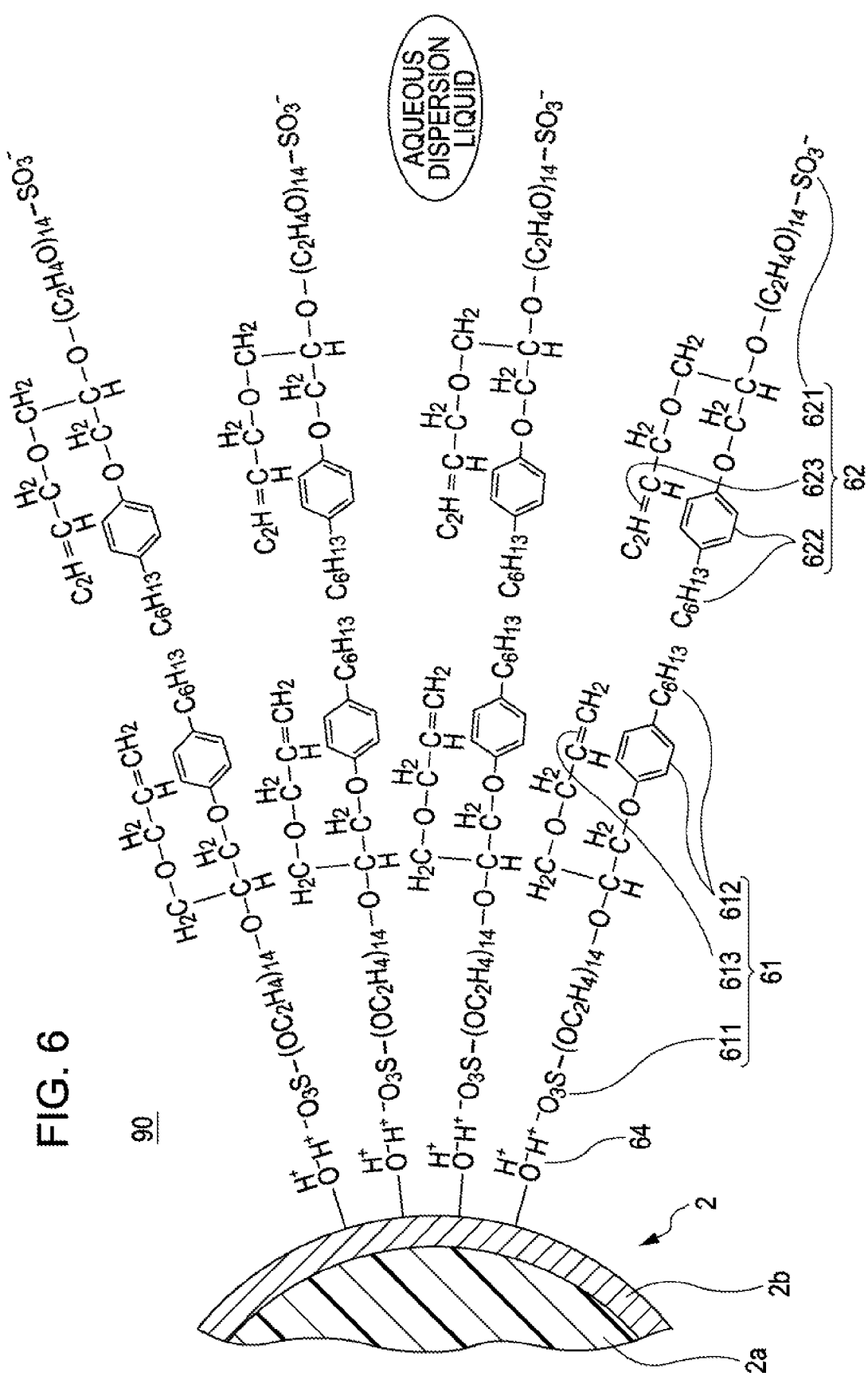

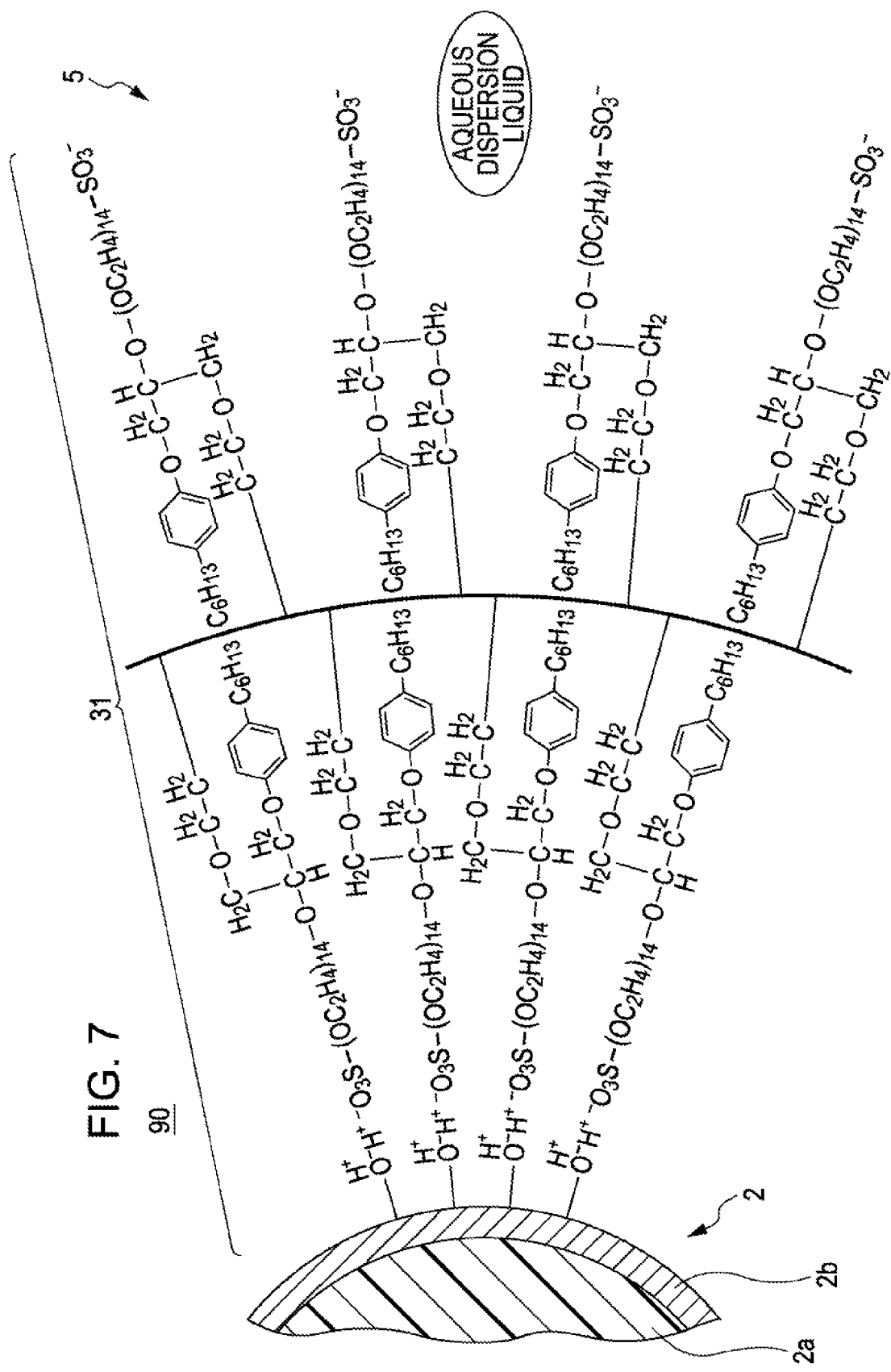

ELECTROPHORESIS PARTICLE, METHOD OF MANUFACTURING ELECTROPHORESIS PARTICLE, ELECTROPHORESIS DISPERSION LIQUID, ELECTROPHORESIS SHEET, ELECTROPHORESIS DEVICE AND ELECTRONIC APPARATUS

BACKGROUND

1. Technical Field

The present invention relates to an electrophoresis particle, a method of manufacturing electrophoresis particle, an electrophoresis dispersion liquid, an electrophoresis sheet, an electrophoresis device and an electronic apparatus.

2. Related Art

Generally, when an electric field is applied to a dispersion system in which tiny particles have been dispersed in a liquid, it is known that tiny particles are moved (migrated) in a liquid by Coulomb's force. This phenomenon is called electrophoresis, and in recent years, an electrophoresis display device which displays the desired information (image) using this electrophoresis has attracted attention as a new display device.

This electrophoresis display device is provided having a display memory property and a wide viewing angle property of the status in which a voltage impression is stopped, and being able to display a high contrast with low power consumption, or the like.

In addition, the electrophoresis display device is also better for eyes when compared to a radiative type display device such as a cathode-ray tube due to it being a non-radiative type device.

It is known that such an electrophoresis display device is provided with an electrophoresis dispersion liquid in which the electrophoresis particles are dispersed in a solvent as an electrophoresis dispersion liquid arranged between a pair of substrates which have an electrode.

In the electrophoresis dispersion liquid of the above configuration, electrophoresis particles including positive charging particles and negative charging particles are used as an electrophoresis particle, and in this manner, it becomes possible to display the desired information (image) by a voltage being applied between a pair of substrates (electrodes).

Here, the electrophoresis particles, including a covering layer in which polymer molecules are linked with respect to the substrate particles generally, are used as an electrophoresis particle, and it becomes possible to disperse and charge the electrophoresis particles in the electrophoresis dispersion liquid by setting a configuration provided such a covering layer (the polymer molecule).

In addition, the electrophoresis particles of the above configuration, for example, are manufactured using atom transfer radical polymerization (ATPR) as follows.

That is, the substrate particles are prepared, and after a silane coupling agent having a polymerization initiating group being bonded onto the surface of the substrate particles, the electrophoresis particles are manufactured by being provided polymer molecules (polymers) in which a monomer has been polymerized using living radical polymerization, setting the polymerization initiating group as the starting point (for example, JP-A-2007-225732).

However, in a case of manufacturing the electrophoresis particles using such an ATPR, since the electrophoresis particles are formed on the surface of the substrate particles by the polymer molecules being directly linked, the charge of the electrophoresis particles (charged status) depends on the charge of the substrate particles as well as the linked polymer molecules. Therefore, in order to impart the aimed for dispersibility and the electrification property to the electrophoresis particles, there is a need to set the number of the polymer molecules which are linked and the electrification amount individually according to the type of the substrate particles, so there are problems in that time and trouble are required.

Therefore, the development for the method of manufacturing the electrophoresis particles which is able to impart the aimed for dispersibility and the electrification property to the electrophoresis particles without depending on the charge of the substrate particles, in other words, without, associating with types of the substrate particles is demanded.

SUMMARY

An advantage of some aspects of the invention is to provide an electrophoresis particle imparted the aimed for dispersibility and the electrification property without associating with types of the substrate particles, a method of manufacturing the electrophoresis particles which is able to manufacture the electrophoresis particles imparted the above characteristics, an electrophoresis dispersion liquid, an electrophoresis sheet, an electrophoresis device and an electronic apparatus having high reliability using the above electrophoresis particles.

The advantage of the invention is achieved by the following invention.

According to an aspect of the invention, there is provided an electrophoresis particle including: a mother particle; and a covering layer which covers at least a part of the mother particle, wherein the covering layer includes a shell which is consisted of an organic polymer and which cellularly engulfs the mother particle and a polymer which is bonded onto the surface of the shell, and the polymer is one that a monomer has been polymerized using living radical polymerization, setting the polymerization initiating group as the starting point.

In this manner, it is possible to set an electrophoresis particle imparted the aimed for dispersibility and the electrification property without associating with types of the mother particle.

In the electrophoresis particle according to the aspect of the invention, it is preferable that the shell form a network structure which is formed by cross-linking between a plurality of the organic polymers.

In this manner, since it is possible to set the shell to have excellent strength, it is possible to reliably suppress peeling off the shell from the mother particle.

In the electrophoresis particle according to the aspect of the invention, it is preferable that the shell be obtained by adding the first polymerizable surfactant having the first polar group which is the opposite polar to the charge of the surface of the mother particle, a hydrophobic group and a polymerizable group into an aqueous dispersion which disperses the mother particle having the charge on the surface to mix, next adding the second polymerizable surfactant having the second polar group, a hydrophobic group and a polymerizable group to emulsify, and then adding polymeric initiator to occur polymerization reaction.

In this manner, since it is possible to set the shell to have excellent strength, it is possible to reliably suppress peeling off the shell from the mother particle.

In the electrophoresis particle according to the aspect of the invention, it is preferable that the monomer include a non-ionic polymer.

In this manner, it is become possible to disperse without agglutinating the electrophoresis particle in the electrophoresis dispersion liquid. In other words, it is possible to impart the characteristics of dispersibility to the electrophoresis particle.

In the electrophoresis particle according to the aspect of the invention, it is preferable that the monomer include a cationic polymer.

In this manner, the electrophoresis particle becomes the electrophoresis particle of positive changeability in the electrophoresis dispersion liquid. In other words, it is possible to impart the characteristics of positive chargeability to the electrophoresis particle.

In the electrophoresis particle according to the aspect of the invention, it is preferable that the monomer include an anionic polymer.

In this manner, the electrophoresis particle become the electrophoresis particle of negative chargeability in the electrophoresis dispersion liquid. In other words, it is possible to impart the characteristics of negative chargeability to the electrophoresis particle.

According to another aspect of the invention, there is provided a method of manufacturing an electrophoresis particle which includes a mother and a covering layer which covers at least a part of the mother particles including: dispersing the mother particle having the charge on the surface into an aqueous dispersion; adding the first polymerizable surfactant having the first polar group which is the opposite polar to the charge of the mother particles, a hydrophobic group and a polymerizable group, into the aqueous dispersion to mix; adding the second polymerizable surfactant having the second polar group, a hydrophobic group and a polymerizable group into the aqueous dispersion to emulsify; obtaining an encapsulated mother particle which is made by engulfing the mother particles in the form of capsules by a shell which is consisted of an organic polymer by adding polymeric initiator into the aqueous dispersion to cause a polymerization reaction to occur;

linking a polymerization initiating group-containing compound onto the surface of the encapsulated mother particle by adding the polymerization initiating group-containing compound having a functional group having reactive property with the second polar group and a polymerization initiating group into the aqueous dispersion to mix; and obtaining the electrophoresis particle by adding a monomer and a catalyzer into the aqueous dispersion and forming a polymer on the surface of the encapsulated mother-particle.

In this manner, as it is possible to accurately suppress the effect of the charge of the mother particle with respect to the electrification characteristics of the electrophoresis particle which is obtained, it is possible to easily manufacture the electrophoresis particle imparted the aimed for dispersibility and the electrification property without associating with types of the mother-particles.

In the method of manufacturing an electrophoresis particle according to the aspect of the invention, it is preferable that the second polar group in which the second polymerizable surfactant includes, be a carboxylate anionicgroup, a sulfonate anionicgroup or phosphate anionicgroup, and the functional group which is included in the polymerization initiating group-containing compound, be a hydroxyl group or an amino group.

In this manner, it is possible to reliably link the second polar group with the functional group in which the polymerization initiating group-containing compound includes.

In the method of manufacturing an electrophoresis particle according to the aspect of the invention, it is preferable that the second polar group which is included in the second polymerizable surfactant, be an alkoxide anionic group and the functional group which is included in the polymerization initiating group-containing compound be a carboxyl group, a sulfonate group or a phosphate group.

In this manner, it is possible to accurately link the second polar group with the functional group which the polymerization initiating group-containing compound includes.

In the method of manufacturing an electrophoresis particle according to the aspect of the invention, it is preferable that the polymer link onto the surface of the encapsulated mother particles to be formed by setting the polymerization initiating group as the starting point, to polymerize the monomer using living radical polymerization.

In this manner, it is possible to easily manufacture the electrophoresis particle imparted the aimed for dispersibility and the electrification property.

In the method of manufacturing an electrophoresis particle according to the aspect of the invention, it is preferable that the polymerization initiating group-containing compound be provided the polymerization initiating group which is polymerized using atom transfer radical polymerization as the polymerization initiating group.

In this manner, it is possible to efficiently proceed living radical polymerization in which the polymerization initiating group and the monomer are reacted together.

According to another aspect of the invention, there is provided an electrophoresis dispersion liquid including the electrophoresis particle according to the aspect of the invention, or an electrophoresis particle manufactured by the method of manufacturing an electrophoresis particle according to the aspect of the invention.

In this manner, it is possible to set the electrophoresis dispersion liquid provided the electrophoresis particle which exhibits both excellent-dispersion power and mobilization.

According to another aspect, of the invention, there is provided an electrophoresiss sheet including a substrate and a plurality of the structures which are arranged above the substrate and respectively store the electrophoresis dispersion liquid according to the aspect of the invention.

In this manner, it is possible to obtain an electrophoresis sheet having excellent reliability.

According to another aspect of the invention, there is provided an electrophoresis device including the electrophoresis sheet according to the aspect of the invention.

In this manner, it is possible to obtain the electrophoresis device having excellent reliability.

According to another aspect of the invention, there is provided an electronic apparatus including the electrophoresis device according to the aspect of the invention.

In this manner, it is possible to obtain the electronic apparatus having excellent reliability.

BRIEF DESCRIPTION OF THE DRAWINGS

The invention will be described with reference to the accompanying drawings, wherein like numbers reference like elements.

FIG. 6 is a partially enlarged view showing a dispersion status of the particles which may occur in an aqueous dispersion in FIG. 3C.

FIG. 7 is a partially enlarged view showing a configuration of an encapsulated mother particle in FIG. 3D.

DESCRIPTION OF EXEMPLARY EMBODIMENTS

Below, description in detail will be given of an electrophoresis particle, a method of manufacturing an electrophoresis particle, an electrophoresis dispersion liquid, an electrophoresis sheet, an electrophoresis device and an electronic apparatus in the invention in suitable embodiments shown in the attached drawings.

Electrophoresis Particle

First, description will be given of an electrophoresis particle of the invention.

Figure 1:
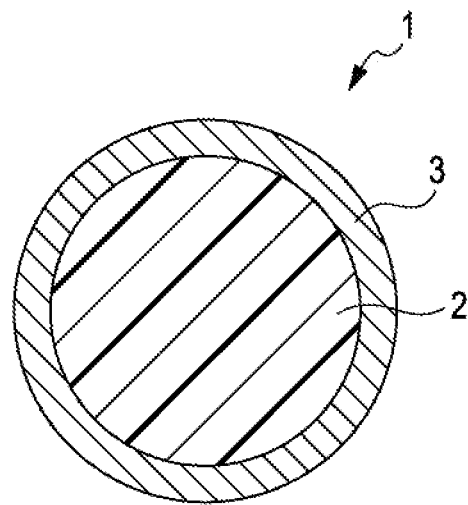
FIG. 1 is a longitudinal sectional view showing an embodiment of an electrophoresis particle in the invention.
Figure 2:
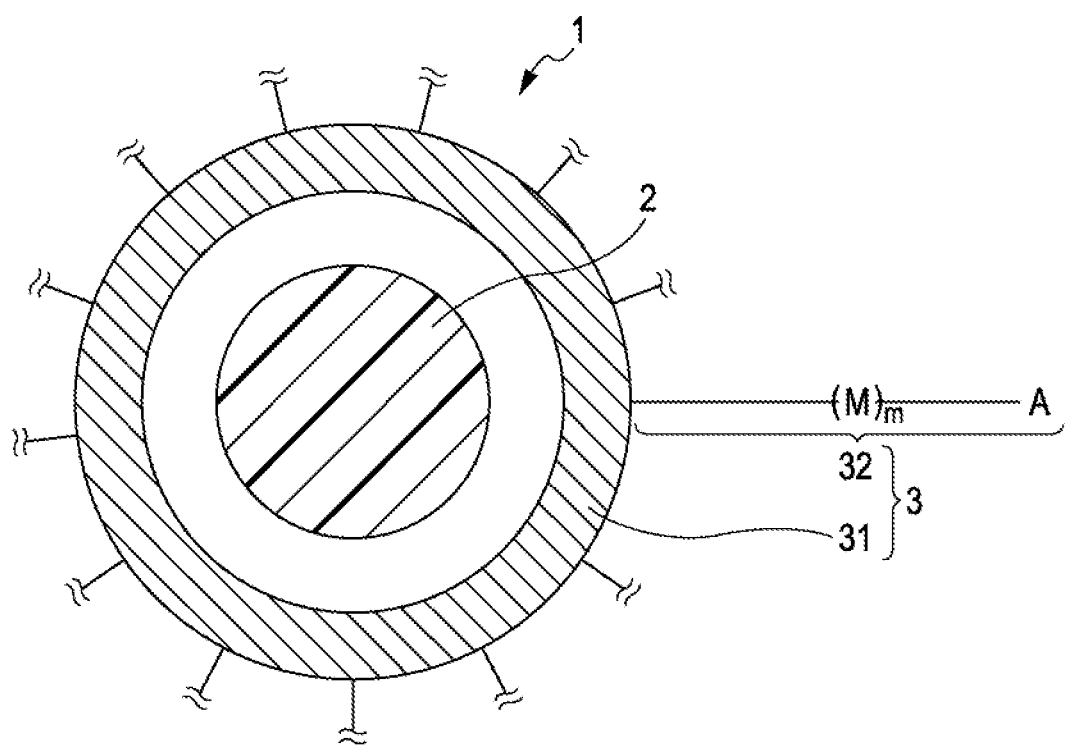
FIG. 2 is a schematic view of a covering layer which is included in the electrophoresis particle shown in FIG. 1.

FIG. 1 is a longitudinal sectional view showing an embodiment of an electrophoresis particle in the invention and FIG. 2 is a schematic view of a covering layer which is included in the electrophoresis particles showing in FIG. 1.

An electrophoresis particle 1 includes a mother particle 2 and a covering layer 3 provided on the surface of the mother particle 2.

As a mother particle 2, for example, at least one kind of pigment particles, dye particles, resin particles or complex particles thereof is suitably used. These particles are easily manufactured.

Examples of the pigment configuring pigment particles include black pigments such as aniline black, carbon black and titan black, white pigments such as titanium dioxide, antimony trioxide, barium sulphate, zinc sulphide, zinc oxide and silicon dioxide, azo-based pigments such as monoazo, disazo and polyazo, yellow pigments such as isoindolinone, chrome yellow, yellow iron oxide, cadmium yellow, titan yellow and antimony, red pigments such as quinacridone red and chrome vermilion, blue pigments such as phthalocyanine blue, indanthrene blue, iron blue, ultramarine and cobalt blue, green pigments such as phthalocyanine green, and the like, and among these, one kind or two kinds or more in combination may be used.

In addition, examples of the dye material configuring dye particles include azo compounds such as Oil Yellow 3G (manufactured by ORIENT CHEMICAL INDUSTRIES CO., LTD.), azo compounds such as Fast Orange G (manufactured by BASF), anthraquinones such as Macrolex Blue RR (manufactured by Bayer AG), anthraquinones such as Sumiplast Green G (manufactured by SUMITOMO CHEMICAL), azo compounds such as Oil Brown GR (manufactured by ORIENT CHEMICAL INDUSTRIES CO., LTD.), azo compounds such as Oil Red 5303 (manufactured by Arimoto Chemical Co., Ltd.) and Oil Red 5B (manufactured by ORIENT CHEMICAL INDUSTRIES CO., LTD.), anthraquinones such as Oil Violet #730 (manufactured by ORIENT CHEMICAL INDUSTRIES CO., LTD.), azo compounds such as Sudan Black X60 (manufactured by BASF), and mixtures of anthraquinone-based Macrolex Blue FR (manufactured by Bayer AG) and azo-based Oil Red XO (manufactured by KANTO CHEMICAL CO., INC.), and among these, one kind or two kinds or more in combination may be used.

In addition, examples of the resin material configuring resin particles include an acrylic-based resin, an urethane-based resin, an urea-based resin, an epoxy-based resin, polystyrene, polyester, and the like, and among these, one kind or two kinds or more in combination may be used.

In addition, examples of the complex particles include particles conducted a coating treatment by covering the surface of the pigment particles by resin materials, particles conducted a coat treatment by covering the surface of resin particles by pigments, particles that are configured by mixtures in which pigments and resin materials are mixed with appropriate composition ratio, or the like.

Here, by arbitrarily selecting types of pigment particles, resin particles and complex particles which are used as the mother particle 2, it is possible to set the color of the electrophoresis particle 1 as the desired color.

Here, the mother particle 2 needs to have the charge on the surface so as to orientate a first polymerizable surfactant 61 to the mother particle 2 in the method of manufacturing the electrophoresis particle to be described later. However, there is a case of not having the charge depending on types of pigment particles, resin particles and complex particles or the amount of charge thereof being inadequate, in this case, it is preferable that the charge be imparted onto the surface of the mother particle 2 by treating compounds having polar character such as a coupling agent, a surfactant agent to be absorbed in advance.

In the mother particle 2, at least a part, of the surface (almost all in the configuration shown in the view) is covered by a covering layer 3.

In the invention, there is a configuration that the covering layer 3 includes a shell 31 that cellularly (in the form of capsules) engulfs the mother particle 2 and a plurality of polymers 32 which are bonded onto the surface of the shell 31.

In this manner, by configuring that, the mother particle 2 is cellularly (in the form of capsules) engulfed by the shell 31, it is possible to accurately suppress the effect due to the charge of the mother particle (the substrate particle) 2. Therefore, by setting types, the number or the like of the polymer 32, it is possible to accurately suppress or prevent the change in the characteristics of the dispersibility, the electrification property, or the like that are imparted to the electrophoresis particle 1 depending on the charge of the mother particle 2. That is, the electrophoresis particle 1 exhibits the characteristics of the aimed dispersibility, the electrification property, or the like without associating with types of the mother particle 2.

The shell 31 is not particularly limited as long as it is configured by an organic polymer and it is possible to cellularly engulf the mother particle 2 with the organic polymer, and in particular, it is preferable that a network structure (linked structure) formed by cross-linking a plurality of the organic polymers to each other be formed. In so doing, since it is possible to set the shell 31 having excellent strength, it is possible to reliably suppress peeling off the shell 31 from the mother particle 2.

It is possible to obtain the shell 31 of the above configuration, for example, by adding the first polymerizable surfactant 61 having a first polar group 611 which is the opposite polar to the charge of the surface of the mother particle 2, a hydrophobic group 612 and a polymerizable group 613 into an aqueous dispersion 90 in which the mother particles 2 having the charge on the surface are dispersed to mix, and next adding a second polymerizable surfactant 62 having a second polar group 621, a hydrophobic group 622 and a polymerizable group 623 to emulsify, and then adding a polymeric initiator to cause polymerization reaction to occur, and regarding the method, description in detail will foe given in the description of the method of manufacturing the electrophoresis particle to be described later.

The polymer 32 is to be polymerized by a monomer using living radical polymerization and for exhibiting the characteristics of the electrophoresis particle 1 in the electrophoresis dispersion liquid to be described later.

A monomer is provided with a polymerizable group so as to be polymerized using living radical polymerization and classified into a non-ionic monomer, an anionic monomer and a cationic monomer based on the characteristics imparted to the electrophoresis particle 1. Here, examples of the polymerizable group that a monomer has include polymerizable groups including carbon-carbon double bond such as a vinyl group, a styryl group, or a (meth) acryloyl group.

By forming the polymer 32 using living radical polymerization using a monomer including a non-ionic monomer, the polymer 32 comes to show excellent affinity with respect to a dispersion medium included in the electrophoresis dispersion liquid to be described later. Therefore, it is possible to disperse without agglutinating the electrophoresis particle 1 provided with the above polymer 32 in the electrophoresis dispersion liquid. That is, it is possible to impart the characteristics of the dispersibility to the electrophoresis particle 1.

Examples of such a non-ionic monomer include an acrylic-based monomer such as 1-hexene, 1-heptene, 1-octene, methyl (meth)aerylate, ethyl (meth)acrylate, propyl (meth)acrylate, stearyl (meth)acrylate, lauryl (meth)acrylate, decyl (meth)acrylate, isooctyl (meth) acrylate, isobornyl (meth)acrylate, cyclohexyl (meth)acrylate, pentafluoro (meth)acrylate and a styrene-based monomer such as styrene, 2-methylstyrene, 3-methylstyrene, 4-methylstyrene, 2-ethylstyrene, 3-ethylstyrene, 4-ethylstyrene, 2-propylstyrene, 3-propylstyrene, 4-propylstyrene, 2-isopropylstyrene, 3-isopropylstyrene, 4-isopropylstyrene,4-tert-butylstyrene.

Further, by forming the polymer 32 using living radical polymerization using a monomer including a cationic monomer, the polymer 32 becomes positively charged (plus) in the electrophoresis dispersion liquid to be described later. Therefore, the electrophoresis particle 1 provided with the above polymer 32 becomes the electrophoresis particle with positive chargeability (the positive electrophoresis particle) in the electrophoresis dispersion liquid. That is, it is possible to impart the characteristics of the positive chargeability to the electrophoresis particle 1.

Examples of such a cationic monomer include a monomer provided with an amino group in the structure thereof, specifically, aminomethyl (meth) acrylate, aminoethyl(meth)acrylate, N,N-dimethylaminoethyl(meth) acrylate, N-ethyl-N-phenylaminoethyl(meth)acrylate, N,N-dimethyl(meth)acrylamide, N,N-diethyl(meth)acrylamide, 4-vinylpyridine, methacroylcholine chloride, or the like.

Further, by forming the polymer 32 using living radical polymerization using a monomer including an anionic monomer, the polymer 32 becomes negatively charged (minus) in the electrophoresis dispersion liquid to foe described later. Therefore, the electrophoresis particle 1 provided the above polymer 32 becomes the electrophoresis particle with negative chargeability (the negative electrophoresis particle) in the electrophoresis dispersion liquid. That is, it is possible to impart the characteristics of negative chargeability to the electrophoresis particle 1.

Examples of such an anionic monomer include a monomer provided with a carboxyl group or sulfonyl group in the structure thereof, specifically, (meth)acrylic acid, carboxymethyl(meth)acrylate, carboxyethyl(meth)acrylate, vinyl benzoate, vinyl phenyl acetate, vinyl phenyl propionic acid, vinyl sulfonic acid, sulfomethyl(meth)acrylate, 2-sulfoethyl(meth)acrylate, or the like.

Since the polymer 32 is formed by various kinds of monomers being polymerized as described above, by setting the number of structural units derived from these monomers, it is possible to set the polymer 32 at the desired level of the characteristics derived from various kinds of monomers.

Here, it is possible to illustrate the polymer 32 obtained from a monomer by a schematic view as FIG. 2, when a monomer is represented as M and a polymerization initiating group which is included in the polymeric initiator, which is described later, is represented as X.

For example, it is possible to manufacture such an electrophoresis particle 1 as follows.

Method of Manufacturing Electrophoresis Particle

Below, description will foe given of a method of manufacturing an electrophoresis particle 1 (a method of manufacturing an electrophoresis particle in the invention).

Here, the method of manufacturing the electrophoresis particle 1 to be described below, is the method to obtain the electrophoresis particle 1 by generating a plurality of polymers 32 on the surface of an encapsulated mother particle 5 after the mother particle 2 has first obtained the encapsulated mother particle 5 engulfed in the form of capsules by the shell 31.

Figure 3A:
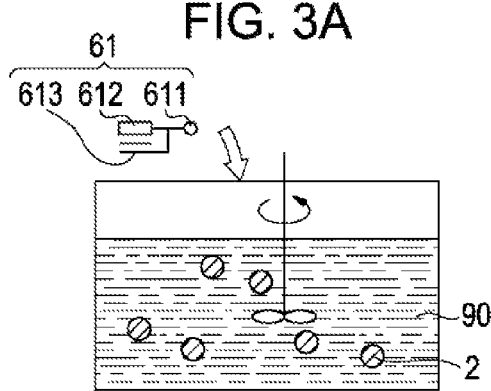
FIGS. 3A to 3F are schematic views for explaining a method of manufacturing the electrophoresis particles in the invention.
Figure 3D:
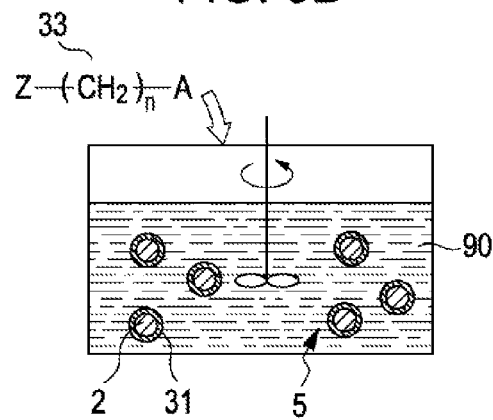
Figure 3B:
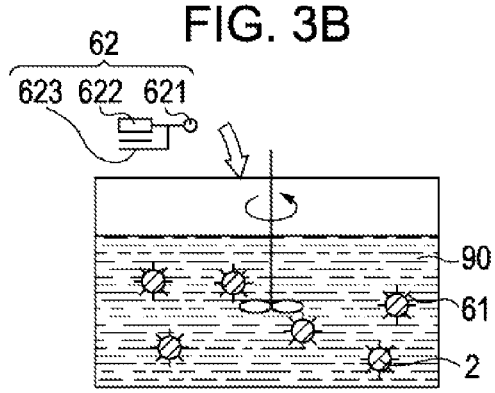
Figure 3E:
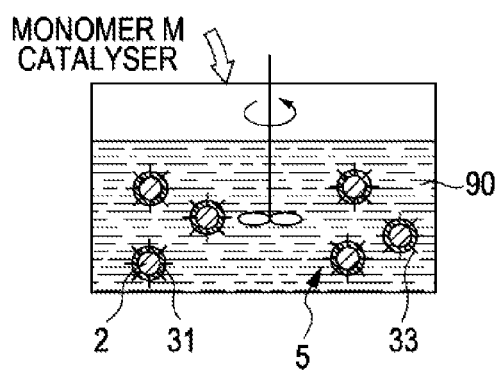
Figure 3C:
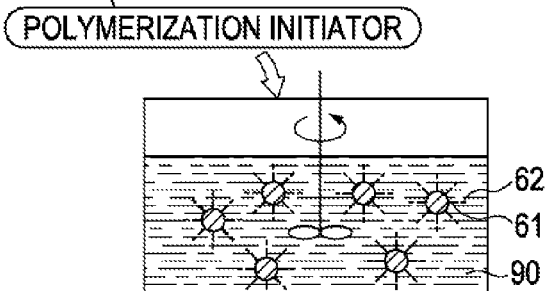
Figure 3F:
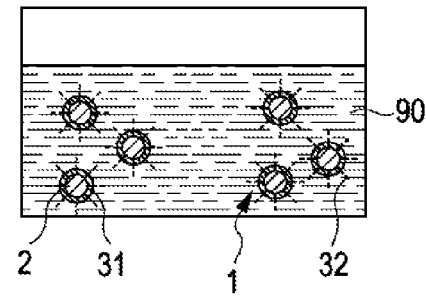
Figure 4A:
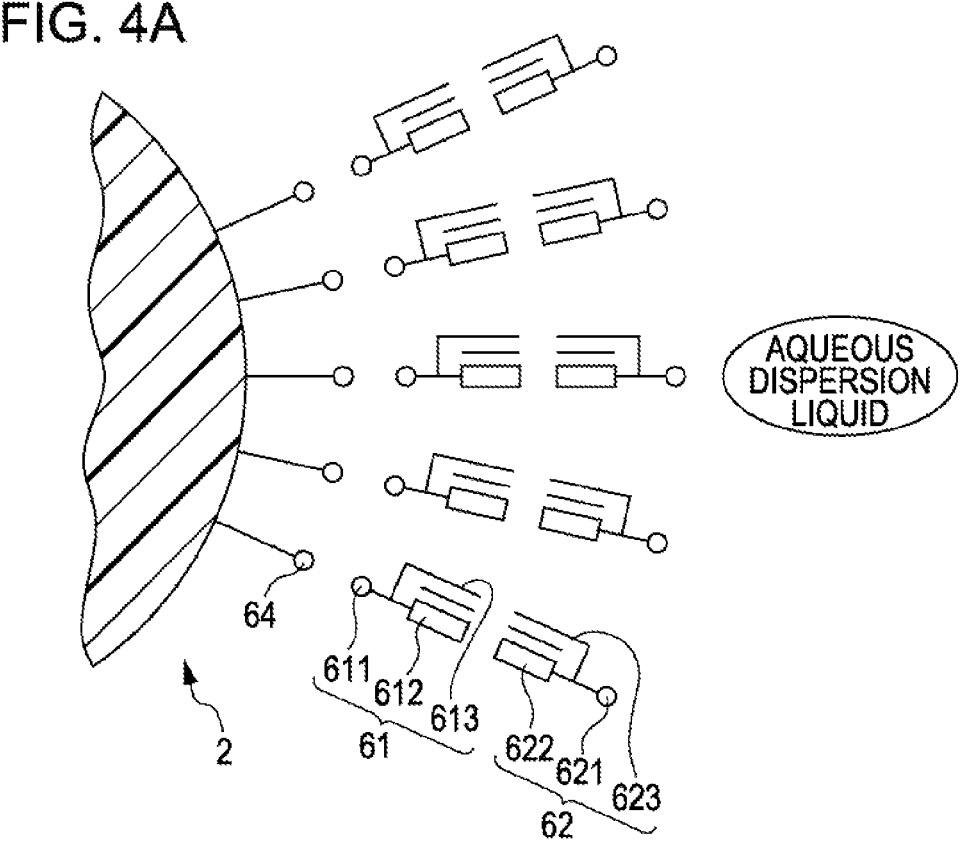
FIGS. 4A and 4B are partially enlarged views showing a dispersion status of the particles which may occur in an aqueous dispersion in FIG. 3C and a partially enlarged view showing an aspect of an encapsulated mother particle in FIG. 3D.
Figure 4B:
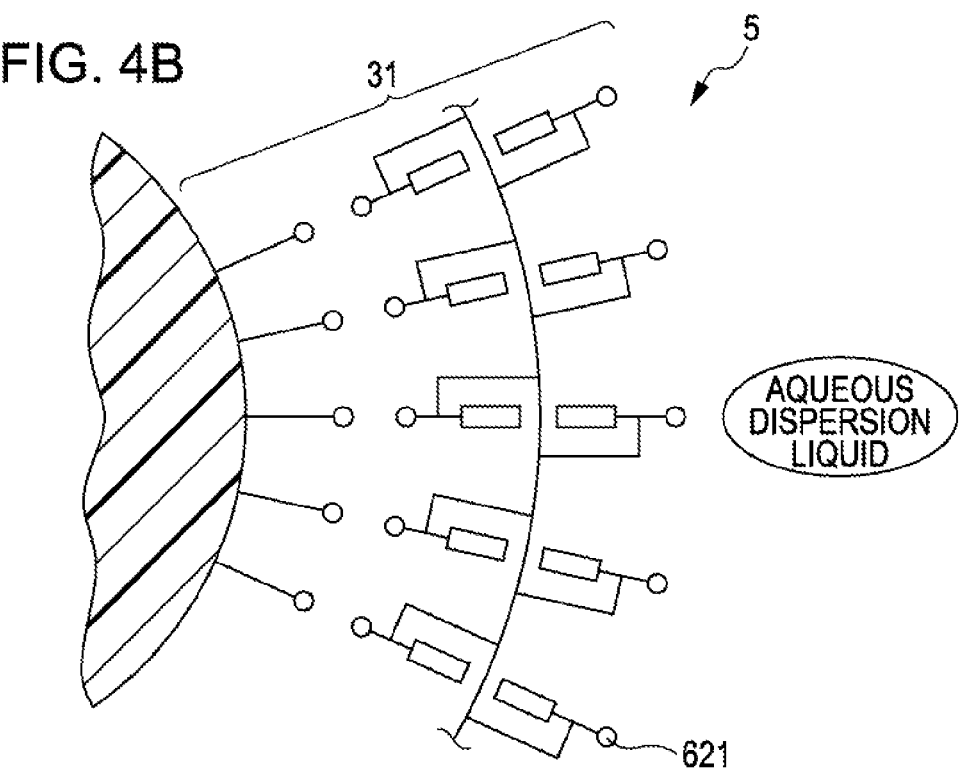

FIG. 3 is a schematic view for explaining a method of manufacturing an electrophoresis particle in the invention, FIG. 4A is a partially enlarged view showing a dispersion status of the particles which may occur in an aqueous dispersion in FIG. 3C and FIG. 4B is a partially enlarged view showing an example of an encapsulated mother particle in FIG. 3D.

Figure 5A:
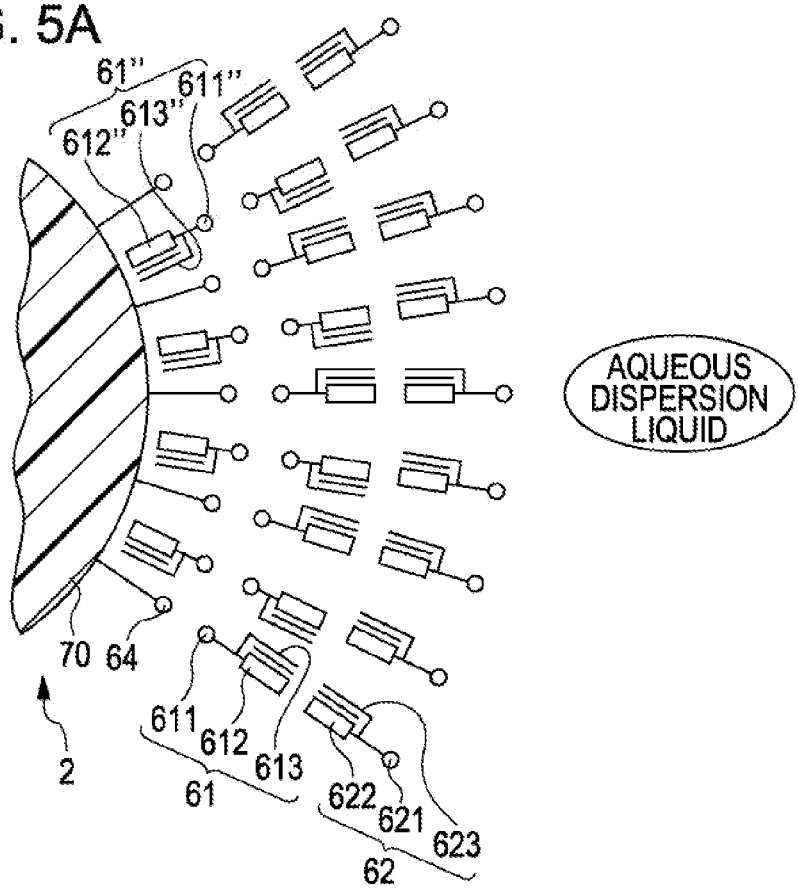
FIGS. 5A and 5B are partially enlarged views showing another dispersion status of the particles which may occur in an aqueous dispersion in FIG. 3C and a partially enlarged view showing another aspect of an encapsulated mother particle in FIG. 3D.
Figure 5B:
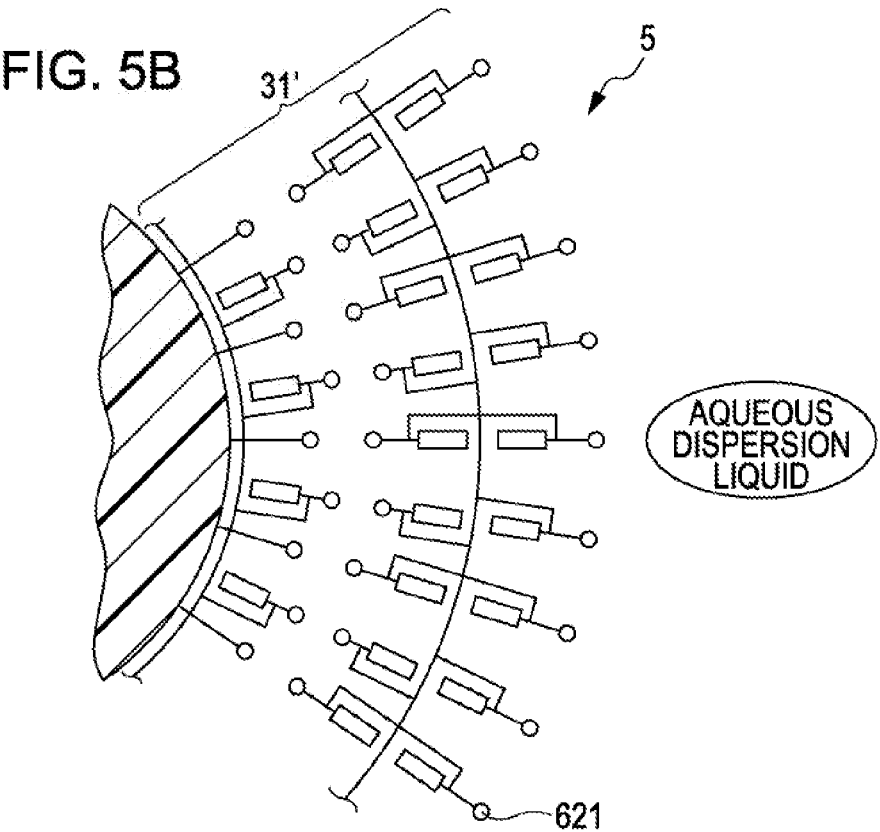

In addition, FIG. 5A is a partially enlarged view showing another dispersion status of the particles which may occur in an aqueous dispersion in FIG. 3C and FIG. 5B is a partially enlarged view showing another example of an encapsulated mother particle in FIG. 3D.

The method of manufacturing the electrophoresis particle 1 includes [1] dispersing a mother particle 2 having the charge on the surface into an aqueous dispersion 90, [2] adding the first polymerizable surfactant 61 having the first, polar group 611 which is the opposite polar to the charge 64 of the mother particles 2, a hydrophobic group 612 and a polymerizable group 613 into the aqueous dispersion 90 to mix, [3] adding the second polymerizable surfactant 62 having the second polar group 621, a hydrophobic group 622 and a polymerizable group 623 into the aqueous dispersion 90 to emulsify, [4] obtaining an encapsulated mother particle 5 which is made by engulfing the mother particle 2 in the form of capsules by a shell 31 which is configured by an organic polymer by adding polymeric initiator 80 into the aqueous dispersion 90 to occur polymerization reaction, [5] linking a polymerization initiating group-containing compound 33 onto the surface of the encapsulated mother particle 5 by adding the polymerization initiating group-containing compound 33 having a functional group Z having reactive property with the second polar group 621 and a polymerization initiating group A into the aqueous dispersion 90 to mix, [6] obtaining the electrophoresis particle 1 by adding a monomer M and a catalyzer into the aqueous dispersion 90 to form a polymer 32, [7] collecting the electrophoresis particle 1 from the aqueous dispersion 90 and [8] drying the electrophoresis particle 1.

In this manner, by forming the shell 31 to cellularly (in the form of capsules) engulf the mother particle 2 before forming the polymer 32, since it is possible to accurately suppress the effect due to the charge of the mother particle (the substrate particle) 2 with respect to the electrification characteristics of the obtained electrophoresis particle 1, it is possible to easily manufacture the electrophoresis particle 1 imparted with the aimed dispersibility and the electrification property without associating with types of the mother particle 2.

Below, description will foe given of each process described above exemplifying a dispersion status which may occur in an aqueous dispersion 90. However, the dispersion status in the electrophoresis dispersion liquid to be exemplified below includes presumptions.

[1] First, a mother particle 2 having the charge 64 on the surface is dispersed into an aqueous dispersion 90.

For the aqueous dispersion 90, for example, it is possible to suitably use various kinds of water such as distilled water, ion-exchanged water, pure water, ultrapure water, or R. O. water singly or the aqueous dispersion 90 mixed with various kinds of lower alcohols such as methanol and ethanol by setting water as a major ingredient.

[2] Next, as shown in FIG. 3A, the first polymerizable surfactant 61 having the first polar group 611 which is the opposite polar to the charge 64 of the mother particles 2, a hydrophobic group 612 and a polymerizable group 613 is added into the aqueous dispersion 90 to mix.

At this time, the additive amount of the first polymerizable surfactant 61 is preferably in the range of 0.5 to 2 time mole with respect to the total number of moles (=weight of the used mother particle 2 [g]×the amount of a polar group having the charge 64 of the mother particle 2 [mol/g]) of a polar group, having the charge 64, converted from the used amount of the mother particle 2 and more preferably in the range of 0.8 to 1.2 time mole. By setting the additive amount as 0.5 time mole or more, it is possible to strongly bond ionically with the mother particle 2 having the charge 64 and to be easily encapsulated. On the other hand, by setting the additive amount as 2 time mole or less, it is possible to reduce the occurrence of the first polymerizable surfactant 61 which non-adsorbs to the mother particle 2 and prevent the occurrence of a polymer particle (particle which consists of only polymers) not having the mother particle 2 as core material.

In addition, the aqueous dispersion 90 may be irradiated with ultrasonic waves for a predetermined time as necessary. In this manner, the arrangement pattern of the first polymerizable surfactant 61 which is present around the mother particle 2 is controlled to a high level.

Specifically, in a case where the mother particle 2 has the negative charge 64, it is possible to use a cationic polymerizable surfactant as the first polymerizable surfactant 61. In contrast, in a case where the mother particle 2 has the positive charge 64, it is possible to use an anionic polymerizable surfactant as the first polymerizable surfactant 61.

Examples of the cationic group which is included in a cationic polymerizable surfactant include a primary amine cationic group, a secondary amine cationic group, a tertiary amine cationic group, a quaternary ammonium cationic group, a quaternary phosphonium cationic group, a sulfonium cationic group, a pyridinium cationic group, or the like.

Among these, a cationic group is preferably one kind selected from a group consisting of a primary amine cationic group, a secondary amine cationic group, a tertiary amine cationic group and a quaternary ammonium cationic group.

A hydrophobic group in which a cationic polymerizable surfactant has preferably includes at least, one of an alkyl group and an aryl group.

A polymerizable group which is included in a cationic polymerizable surfactant is preferably a radical polymerizable unsaturated hydrocarbon group.

Further, among radical polymerizable unsaturated hydrocarbon groups, one kind selected from a group consisting of a vinyl group, an allyl group, an acryloyl group, a methacryloyl group, a propenyl group, a vinylidene group, a vinylene group is preferable. Furthermore, among these, especially, an acryloyl group, a methacryloyl group may be exemplified as more preferable examples.

Examples of the cationic polymerizable surfactant may include a cationic allyl acid derivative described in JP-B-4-65824, or the like. Specific examples of a cationic polymerizable surfactant may include dimethylaminoethyl methacrylate methyl chloride, dimethylaminoethyl methacrylate benzyl chloride, methacryloyloxyethyl trimethyl ammonium chloride, diallyl dimethyl ammonium chloride, 2-hydroxy-3-methacryloxypropyl trimethyl ammonium chloride, or the like.

In addition, as a cationic polymerizable surfactant, commercial products may be also used. For example, Acryester DMC (MITSUBISHI RAYON CO., LTD.), Acryester DML60 (MITSUBISHI RAYON CO., LTD.), C-1615 (DAI-ICHI KOGYO SEIYAKU CO., LTD.), or the like may be included.

The cationic polymerizable surfactant exemplified above may foe used alone or as a mixture of two or more kinds.

On the other hand, examples of the anionic group which is included in an anionic polymerizable surfactant include a sulfonate anionic group ($-SO_3-$), a sulfinate anionic group ($-RSO_2-$: R is an alkyl group having 1 to 12 carbon atoms or a phenyl group, or modified body thereof), a carboxylate anionic group ($-COO-$), a phosphate anionic group ($-PO_3-$), an alkoxide anionic group ($-O-$), or the like, however, one kind selected from a group consisting of these is preferable.

A hydrophobic group which is included in an anionic polymerizable surfactant may be used from the same hydrophobic group as a hydrophobic group which is included in the cationic polymerizable surfactant as described before.

A polymerizable group which is included in an anionic polymerizable surfactant may be used from the same polymerizable group as a polymerizable group which is included in cationic polymerizable surfactant as described before.

Examples of the anionic polymerizable surfactant may include an anionic allyl derivative described in JP-B-49-46291, JP-B-1-24142 and JP-A-62-104802, an anionic propenyl derivative described in JP-A-62-221431, an anionic acrylic acid derivative described in JP-A-62-34947 and JP-A-55-11525, an anionic itaconic acid derivative described in JP-B-46-34898 and JP-A-51-30284, or the like.

As a specific example of such an anionic polymerizable surfactant, a compound which is represented by the general formula (31):

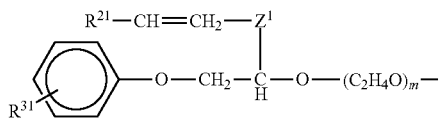
(31)

[In the formula, $R^{21}$ and $R^{31}$ are each independently a hydrogen atom or a hydrocarbon group having 1 to 12 carbon atoms, $Z^1$ is carbon-carbon single bond or a group which is represented by the formula —$CH_2$—O—$CH_2$—, m is an integer of 2 to 20, X is a group which is represented by the formula —$SO_3M^1$ and $M^1$ is an alkali metal, an ammonium salt or an alkanolamine]

or a compound which is represented by the general formula (32):

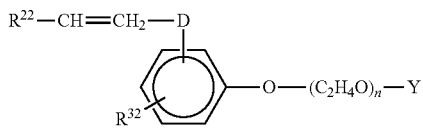
(32)

[In the formula, $R^{22}$ and $R^{32}$ are each independently a hydrogen atom or a hydrocarbon group having 1 to 12 carbon atoms, D is carbon-carbon single bond or a group which is represented by the formula —$CH_2$—O—$CH_2$—, n is an integer of 2 to 20, Y is a group which is represented by the formula —$SO_3M^2$ and $M^2$ is an alkali metal, an ammonium salt or an alkanolamine]

is preferable.

The polymerizable surfactant which is represented by the formula (31) is described in JP-A-5-320276 and JP-A-10-316909. By arbitrarily adjusting the kind Of $R^{21}$ and the value of X in the formula (31), it is possible to correspond to the degree of the amount of charge of the charge 64 which is included in the mother particle 2. Examples of the preferable polymerizable surfactant represented by the formula (31) may include a compound which is represented by the following formula (310) and specifically, may include compounds which are represented by the following formulae (31a) to (31d).

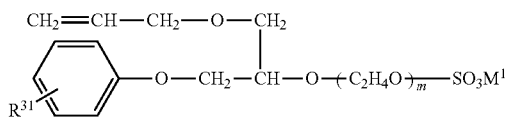
(310)

[In the formula, $R^{31}$, m, and $M^1$ are as same as the compound represented by the formula (31)]

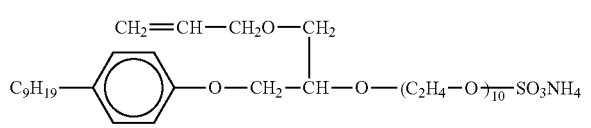
(31a)

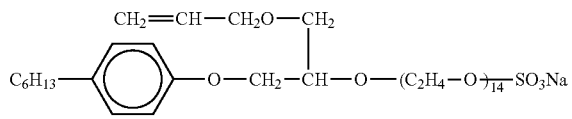
(31b)

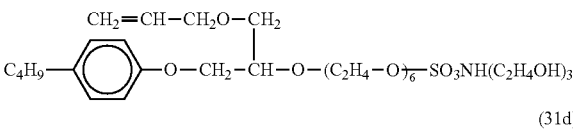
(31c)

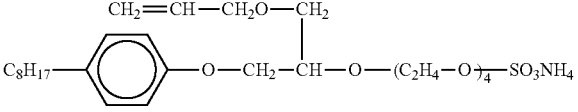
(31d)

Adeka Reasoap SE-10N of ASAHI DENKA KOGYO k.k. is a compound to be set where $M^1$ is $NH_4$, $R^{31}$ is $C_9H_{19}$ and m=10 in a compound which is represented by the formula (310). Adeka Reasoap SE-20N of ASAHI DENKA KOGYO k.k. is a compound to be set where $M^1$ is $NH_4$, $R^{31}$ is $C_9H_{19}$ and m=20 in a compound which is represented by the formula (310).

In addition, as an anionic group which is included an anionic polymerizable surfactant, for example, a compound which is represent by the general formula (33):

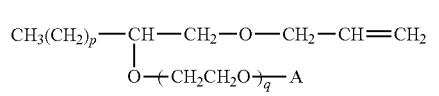
(33)

[In the formula, p is 9 or 11, q is an integer of 2 to 20, A is a group which is represented by —$SO_3M^3$, $M^3$ is an alkali metal, an ammonium salt or an aikanolamine]

is preferable. As the preferable anionic polymerizable surfactant which is represented by the formula (33), the following compounds may be included.

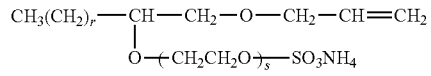

[In the formula, r is 9 or 11 and s is 5 or 10]

As the anionic polymerizable surfactant, commercial products may be also used. For example, Aquaron KH series (Aquaron KH-5 and Aquaron KH-10) of DAI-ICHI KOGYO SEIYAKU CO., LTD., or the like may be included. Aquaron KH-5 is a mixture of a compound that is set as r is 9 and s is 5 and a compound that is set as r is 11 and s is 5 in a compound which is indicated by the formula descried above, Aquaron KH-10 is a mixture of a compound that is set as r is 9 and s is 10 and a compound that is set as r is 11 and s is 10 in a compound which is indicated by the formula described above.

In addition, as an anionic polymerizable surfactant, a compound which is represented by the formula (34) described below is preferable.

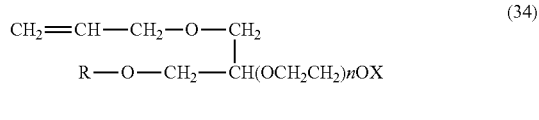

(34)

[In the formula, R is an alkyl group having 8 to 15 carbon atoms, n is an integer of 2 to 20, X is a group which is represented by —$SO_3B$, B is an alkali metal, an ammonium salt or an alkanolamine.]

As the anionic polymerizable surfactant, commercial products may be also used. Examples of the commercial product may include, for example, Adeka Reasoap SR series of ASAHI DENKA KOGYO k.k. (Adeka Reasoap SR-10, SR-20 and R-1025) (all, product names), or the like. Adeka Reasoap SR series are compounds in which B is represented by $NH_4$ in the general formula (34), SR-10 is a compound of n=10 and SR-20 is a compound of n=20.

In addition, as an anionic polymerizable surfactant, a compound which is represented by the following formula (A) is also preferable.

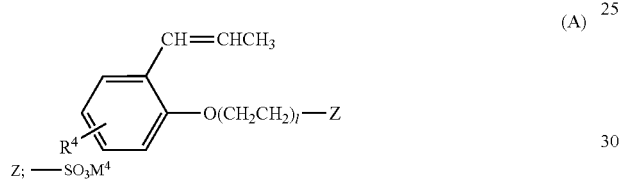

(A)

[In the formula describe above, $R^4$ represents a hydrogen atom or a hydrocarbon group having 1 to 12 carbon atoms, I represents an integer of 2 to 20 and $M^4$ represents an alkali metal, an ammonium salt or an alkanolamine.]

As the anionic polymerizable surfactant, commercial products may be also used. Examples of the commercial product, for example, include Aquaron HS series (Aquaron HS-1, HS-20 and HS-1025) (all, product names) of DAI-ICHI KOGYO SEIYAKU CO., LTD., or the like.

In addition, examples of the anionic polymerizable surfactant used in the invention, for example, may include an alkylaryl sulfosuccinate sodium salt which is represented by the general formula (35).

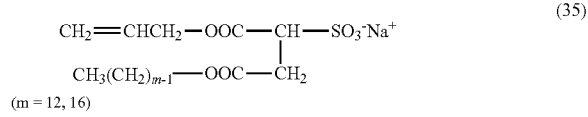

(35)

As the anionic polymerizable surfactant, commercial products may be also used. Examples of the commercial product may include, for example, Eleminol JS-2 of Sanyo Chemical Industries, Ltd., which is a compound represented by m=12 in the general formula (35).

In addition, examples of an anionic polymerizable surfactant used in the invention may include, for example, methacryloyioxy polyoxyalkylene sulfate ester sodium salt which is represented by the general formula (36). In the following formula, n is 1 to 20.

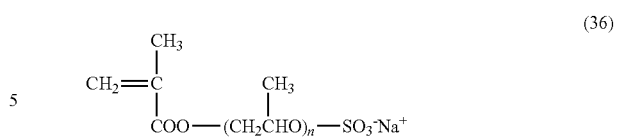

(36)

As the anionic polymerizable surfactant, commercial products may be also used. Examples of the commercial product may include, for example, Eleminol RS-30 of Sanyo Chemical Industries, Ltd., which is a compound represented by n=9 in the general formula (36).

In addition, as an anionic polymerizable surfactant used in the invention, for example, a compound which represented by the general formula (37) may be used.

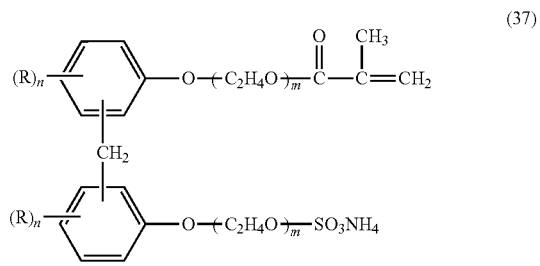

(37)

As the anionic polymerizable surfactant, commercial products may be also used and Antox MS-60 of Nippon Nyukazai Co., Ltd. is an equivalent of this.

The anionic polymerizable surfactants exemplified above may be used alone or as a mixture of two or more kinds.

Further, it is preferable that an organic polymer which configures the shell 31 include a repeating structural unit derived from a hydrophobic monomer.

This hydrophobic monomer includes at least a hydrophobic group and a polymerizable group in the molecular structure thereof. By including such a hydrophobic monomer, it is possible to improve the hydrophobic property and polymerizable property of the shell 31. As a result, it is possible to improve the mechanical strength and the durability of the shell 31.

Among these, as a hydrophobic group, a hydrophobic group including at least one kind of an aliphatic hydrocarbon group, an alicyclic hydrocarbon group and an aromatic hydrocarbon group may be exemplified.

A methyl group, an ethyl group, a propyl group, or the like as an aliphatic hydrocarbon group, a cyclohexyl group, a dicyclopentenyl group, a dicyclopentanyl group, a isobornyl group, or the like as an alicyclic hydrocarbon group and a benzyl group, a phenyl group, a naphthyl group, or the like as an aromatic hydrocarbon group may be included.

In addition, as a polymerizable group, it is preferable that a polymerizable group be an unsaturated hydrocarbon group which is capable of radical polymerization and one kind selected from a group consisting of a vinyl group, an allyl group, an acryloyl group, a methacryloyl group, a propenyl group, a vinylidene group and a vinylene group.

Specific examples of the hydrophobic monomer include styrene and a styrene derivative such as methyl styrene, dimethyl styrene, chlorostyrene, dichlorostyrene, bromostyrene, p-chloromethylstyrene or divinylbenzene; monofunctional acrylic esters as methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyl oxyethyl acrylate, tetrahydrofurfuryl acrylate or isobornyl acrylate; monofunctional methacrylic esters such as methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate or isobornyl methacrylate; an allyl compound such as allyl benzene, allyl-3-cyclohexane propionate, 1-allyl-3,4-dimethoxybenzene, allylphenqxy acetate, allylphenyl acetate, allylcyclohexane or polyhydric allyl carbonate, esters of fumaric acid, maleic acid or itaconic acid; and a monomer having radical polymerizable group such as N-substituted maleimide or cyclic olefin. The hydrophobic monomer is arbitrarily selected to satisfy the required characteristics described above and the addictive amount thereof is arbitrarily determined.

In addition, it is preferable that the organic polymer which configures the shell 31 include a repeating structural unit derived from a cross-linked monomer and/or a repeating structural unit derived from a monomer which is represented by the following general formula (1).

GENERAL FORMULA (1)

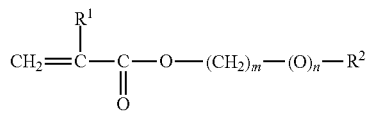

[However, $R^1$ represents a hydrogen atom and a methyl group. $R^2$ represents t-butyl group, an alicyclic hydrocarbon group, an aromatic hydrocarbon or a heterocyclic group, m is an integer of 0 to 3 and n is an integer of 0 or 1.]

By the organic polymer which configures the shell 31 having a repeating structural unit derived from a cross-linked monomer, since a more refined cross-linked structure is formed in polymers, it is possible to improve the mechanical strength of the shell 31, and the electrophoresis particle 1.

By the organic polymer having a repeating structural unit derived from a monomer which is represented by the general formula (1), the flexibility of a molecular of the shell 31 is decreased, in other words, due to the mobility of a molecular being constrained, due to the $R^2$ group which is a "bulky" group, the mechanical strength of the shell 31 is improved. In addition, by the $R^2$ group, which is a "bulky" group being present in the shell 31, the solvent resistance of the shell 31 becomes excellent. In the general formula (1), examples of the alicyclic hydrocarbon group which is indicated by $R^2$ include, for example, a cycloalkyl group, a cycloalkenyl group, an isobornyl group, a dicyclopentanyl group, a dicyclopentenyl group, an adamantane group, tetrahydrofuran group, or the like.

Specific examples of the cross-linked monomer are a cross-linked monomer having a compound which has two or more unsaturated hydrocarbon groups of one or more kinds selected from a vinyl group, an allyl group, an acryloyl group, a methacryloyl group, a propenyl group, a vinylidene group and a vinylene group, for example, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxy neopentylglycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy.diethoxy)phenyl]propane, 2,2-bis[4-(acryloxyethoxy.polyethoxy)phenyl] propane, hydroxy pivalic acid neopentyl glycol diacrylate, 1,4-butanediol diacrylate, dicyclopentanyl diacrylate, dipentaerythritol hexaacrylate, dipentaerythritol monohydroxy pentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxyl propane, 2,2-bis[4-(methacryloxy)phenyl]propane, 2,2-bis[4-(methacryloxyethoxy) phenyl]propane, 2,2-bis[4-(methacryloxyethoxy)phenyl] propane, 2,2-bis[4 (methacryloxyethoxy polyethoxy)phenyl] propane, tetrabromobisphenol A dimethacrylate, dicyclopentanyl dimethacrylate, dipentaerythritol hexamethacrylate, glycerol dimethacrylate, hydroxy pivalic acid neopentyl glycol dimethacrylate, dipentaerythritol monohydroxy pentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate, diethylene glycol bis allyl carbonate, or the like is included.

As specific examples of the monomer which is represented by the general formula (1), for example, the following examples are included.

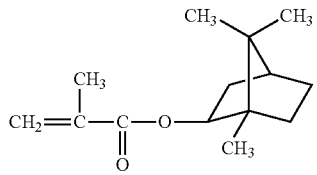

ISOBORNYL METHACRYLATE

WEATHER RESISTANCE
Homopolymer Tg 155° C.
(180° C.)

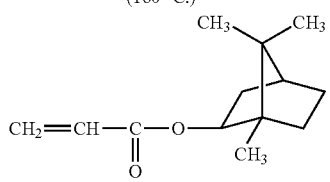

ISOBORNYL ACRYLATE

WEATHER RESISTANCE
Homopolymer Tg 94° C.

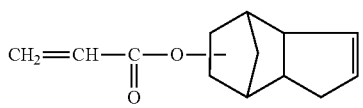

DICYCLOPENTENYL ACRYLATE

IMPART THE ADHESION TO
ACRYLIC RESIN
Homopolymer Tg 120° C.

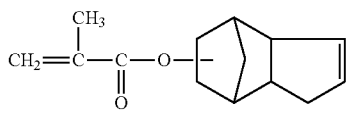

DICYCLOPENTENYL METHACRYLATE

CHEMICAL RESISTANCE

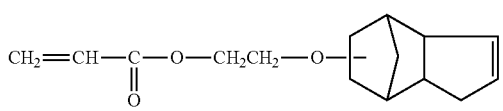

DICYCLOPENTENYL OXYETHYL ACRYLATE

IMPART THE ADHESION

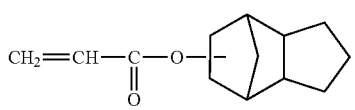

DICYCLOPENTANYL ACRYLATE

LOW ABSORBENCY
WEATHER RESISTANCE
Homopolymer Tg 120° C.

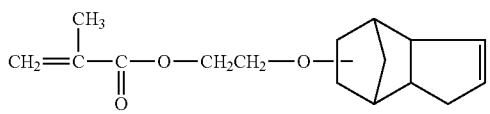

DICYCLOPENTENYL OXYETHYL METHACRYLATE

CHEMICAL RESISTANCE

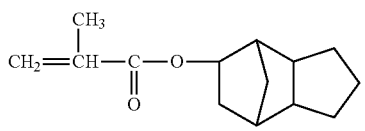

DICYCLOPENTANYL METHACRYLATE

LOW ABSORBENCY
WEATHER RESISTANCE
Homopolymer Tg 175° C.

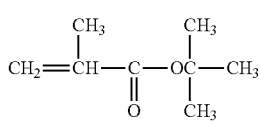

T-BUTYL METHACRYLATE

Homopolymer Tg 107° C.

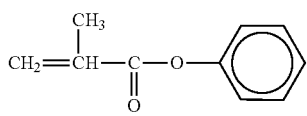

BENZYL METHACRYLATE

Homopolymer Tg 54° C.

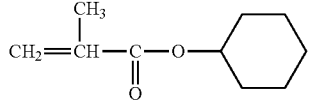

CYCLOHEXYL METHACRYLATE

Homopolymer Tg 66° C.

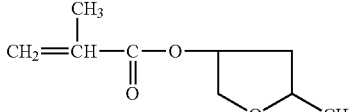

TETRAHYDROFURFURYL METHACRYLATE

Homopolymer Tg 60° C.

[3] Next, the second polymerizable surfactant 62 having the second polar group 621, a hydrophobic group 622 and a polymerizable group 623 is added into the aqueous dispersion 90 as shown in FIG. 3B and is emulsified as shown in FIG. 3C.

That is, among conditions selected from:

(A) the polar of the second polar group 621 in which the second polymerizable surfactant 62 has to be added, (B) the number of the second polar group 621 in the second polymerizable surfactant 62, (C) the valence of the second polar group 621, (D) the number of molecules of the second polar group 621, (E) the additive amount of the second polymerizable surfactant 62, it is possible to suppress the electrification polar and the amount of electrification on the surface of the shell 31 by setting at least one condition Of (A), (B), (C), (D) and (E) in the process.

In addition, the additive amount of the second polymerizable surfactant 62 is preferably the range of approximately 1 to 10 time mole with respect to the first, polymerizable surfactant 61 added in the process [2] described above and is more preferably the range of approximately 1 to 5 time mole. By setting the additive amount as 1 time mole or more, it is possible to more accurately control the amount of electrification of the shell 31. On the other hand, by setting the additive amount as 10 time mole or less, it is possible to suppress the occurrence of a hydrophilic monomer which does not contribute to the form of the shell 31 and prevent the occurrence of a polymer particle in which a core material is not present except an encapsulated mother particle 5.

In addition, the aqueous dispersion 90 may be irradiated with ultrasonic waves for the predetermined time as necessary. In this manner, the arrangement pattern of the second polymerizable surfactant 62 which is present around the mother particle 2 is controlled to a high level.

As the second polymerizable surfactant 62, among the polymerizable surfactants included as the first polymerizable surfactant described above, a polymerizable surfactant having a cationic group such as a primary amine cationic group, a secondary amine cationic group, a tertiary amine cationic group or a quaternary ammonium cationic group and an anionic group such as a sulfonate anionic group, a sulfinic acid anionic group, a carboxylate anionic group, a phosphate anionic group, an alkoxide anionic group, is used so as to react, with a polymeric initiator having a polymerization initiating group in the latter process [5].

[4] Next, polymerization reaction occurs by adding polymeric initiator 80 into the aqueous dispersion 90 as shown in FIG. 3C. In this manner, an encapsulated mother particle 5 which is made by engulfing the mother particle 2 in the form of capsules by the shell 31 which is configured by an organic polymer as shown in FIG. 3D, is obtained.

At this time, the temperature of the aqueous dispersion 90 is heated up to the predetermined temperature (the temperature which activates the polymeric initiator 80) as necessary. In this manner, it is possible to reliably activate the polymeric initiator 80 and suitably proceed the polymerization reaction in the aqueous dispersion 90.

As a polymeric initiator 80, a water-soluble polymeric initiator is preferable, potassium persulfate, ammonium persulfate, sodium persulfate, 2,2-azobis-(2-methylpropion amidine)dihydrochloride, 4,4-azobis(4-cyanovaleric acid), or the like is included and among these, one kind or two kinds or more in combination may be used.

Here, according to an emulsion polymerization method which is the polymerization in the aqueous dispersion 90 which has been explained above, it is presumed that the first polymerizable surfactant 61 and each monomer show the following behaviour. Here, below, description will be given in a case of further adding a hydrophobic monomer in the process [2].

First, by irradiating with ultrasonic waves to the charge 64 which is included in the mother particle 2 to absorb the first polymerizable surfactant 61 and next by adding a hydrophobic monomer and further processing the second polymerizable surfactant 62 to be added and irradiated with ultrasonic waves, the arrangement pattern of the first polymerizable surfactant 61 which is present around the mother particle 2 and a monomer is controlled with to a fairly high level, the status in which the first-polar group 611 is orientated toward the mother particle 2 on the inner-most shell and the second polar group 621 is orientated toward the aqueous dispersion 90 on the outer-most shell is formed. Then, by a monomer being transformed into an organic polymer to form the shell 31, as the pattern which is controlled to a high level by an emulsion polymerization, the encapsulated mother particle 5 which is made by engulfing the mother particle 2 in the form of capsules by the shell 31 is formed.

According to the method described above, it is possible to decrease the generation of a water-soluble oligomer or a polymer which are by-products. In so doing, it is possible to reduce the viscosity of the aqueous dispersion 90 which disperses the obtained encapsulated mother particle 5 and therefore further facilitate the refining process of an ultrafiltration or the like.

The polymerization reaction as described above is preferably conducted in a reactor vessel that is provided with an ultrasonic generator, a mixer, a reflux condenser, a dropping funnel and a temperature regulator.

By increasing the temperature up to the cleavage-temperature of the polymeric initiator 80 which is added into the reaction system (the aqueous dispersion 90), a polymerization reaction makes the polymeric initiator 80 cleave and makes an initiator radical generate. By the initiator radical attacking an unsaturated group of each polymerizable surfactant 61 and 62 or an unsaturated group of a monomer, the polymerization reaction is initiated.

It is possible for adding the polymeric initiator 80 into the reaction system, for example, to easily execute by dripping a solution in which the water-soluble polymeric initiator 80 is dissolved into the pure water, into the reactor vessel. At this time, a solution including the polymeric initiator 30 in the aqueous dispersion 90 which is heated up to the temperature at which the polymeric initiator 30 is activated may be added all at once or separately, or may be continuously added.

In addition, after adding the polymeric initiator 80, the aqueous dispersion 90 may be heated up to the temperature which activates the polymeric initiator 80.

Here, as described above, it is preferable that a water-soluble polymeric initiator be used as a polymeric initiator 80 and a solution obtained by dissolving this into the pure water be added by dripping it into the aqueous dispersion 90 in the reactor vessel. In this manner, the added polymeric initiator 80 is cleaved, the initiator radical is generated, and by this attacking a polymerizable group of each polymerizable surfactant 61 and 62 or a polymerizable group of a polymerization monomer, the polymerization reaction occurs. The polymerization temperature and polymerization reaction time vary depending on types of the polymeric initiator 80 used and types of the polymerization monomer, however, a person skilled in the art can facilitate the process to arbitrarily set the suitable polymerization conditions.

It is possible for the activation of the polymeric initiator 80 in the reaction system to be suitably executed by heating up the aqueous dispersion 90 to the predetermined polymerization temperature as described above. The polymerization temperature is preferably set as the range of 60 to 90° C. In addition, the polymerization time is preferably set from 3 to 10 hours.

The encapsulated mother particle 5 which is obtained as described above becomes a particle in which the mother particle 2 is engulfed by the shell 31.

Here, in the manufacturing process of the encapsulated mother particle 5 obtained in so doing, description in more detail will be given of one example of the behaviour in which each polymerizable surfactant, and each monomer show based on FIG. 4.

When the first polymerizable surfactant 61 is added to the aqueous dispersion 90, the charge 64 which is included in the mother particle 2 and the first polar group 611 of the first polymerizable surfactant 61 are ionically bonded. By the opposite polar being bonded to each other, both polars are cancelled.

In addition, with the first hydrophobic group 612 of the first polymerizable surfactant 61 and the hydrophobic group 622 of the second polymerizable surfactant 62 being faced, the second polar group 621 of the second polymerizable surfactant 62 is oriented facing the aqueous dispersion 90 side to form a micelle like structure as shown in FIG. 4A.

When the polymerization reaction is conducted in these conditions, the shell 31 configured by an organic polymer in which the structure is maintained as shown in FIG. 4B, is formed on the surface of the mother particle 2. In other words, the arrangement pattern of each polymerizable surfactant 61 and 62 which are present around the mother particle 2 before the polymerization reaction is controlled to a fairly high level. Then by emulsion polymerization reaction, the polymerizable surfactant 61 and 62, and each monomer are transformed into organic polymers as a pattern which has been controlled to a high level. Therefore, an encapsulated mother particle 5 which is manufactured using the above method becomes the encapsulated mother particle in which the structure is controlled with a fairly high level of accuracy.

In addition, description will be given of another example of the behaviour which are shown in each polymerizable surfactant and each monomer based on FIG. 5.

In the first polymerizable surfactant 61, the first polar group 611 is oriented toward the mother particle 2 having the negative charge 64 and absorbed with ionically strong bonds as shown in FIG. 5A. Then the hydrophobic group 622 and the polymerizable group 623 of the second polymerizable surfactant 62 are faced each other and the second polar group 621 is faced in a direction in which the aqueous dispersion 90 is present, in other words, in a direction away from the mother particle 2 by the hydrophobic interaction with respect to the hydrophobic group 612 and the polymerizable group 613 of the first polymerizable surfactant 61.

In addition, the surface of the mother particle 2 has a negative charge 64 which is chemically bonded with the specific density and hydrophobic area 70 between the negative charges 64 and in hydrophobic area 70, a hydrophobic group 612" and a polymerizable group 613" of another first polymerizable surfactant 61" are faced each other. Then in the first polar group 611" of another first, polymerizable surfactant 61", the first, polymerizable surfactant 61 is arranged so as to be faced to the first polar group 611. The hydrophobic group 622 and the polymerizable group 623 of the second polymerizable surfactant 62 are faced each other and the second polar group 621 is faced in a direction in which the aqueous dispersion 90 is present, in other words, in a direction away from the mother particle 2 by the hydrophobic interaction in each hydrophobic group 612 and each polymerizable group 613 of the first polymerizable surfactant 61.

When, for example, the polymeric initiator 80 is added into the aqueous dispersion 90 of such a dispersion condition, the encapsulated mother particle 5 in which the mother particle 2 is engulfed by the shell 31' is produced as shown in FIG. 5B by polymerizing each polymerizable group 613, 613" and 623 of the first polymerizable surfactant 61 and 61", and the second polymerizable surfactant 62.

In the polymerization system, since each such polymerizable surfactant 61 and 62 forms a micelle like structure in which the second polar group 621 of the second polymerizable surfactant 62 in the outer-most shell facing the aqueous dispersion 90 side is oriented and forms the shell 31 by generating an organic polymer using the polymerization reaction after the charge 64 which is included in the mother particle 2 and the first polar group 611 of the first polymerizable surfactant 61 are ionically bonded, the arrangement pattern of a monomer which is present around the mother particle 2 before the emulsion polymerization affects the status of the polarization in the vicinity of the mother particle 2 after the polymerization, therefore, it may be said that it is possible to control the process with a fairly high level of accuracy.

As a result, the obtained encapsulated mother particle 5, in which the second polar 621 is arranged outside thereof, becomes the encapsulated mother particle having the electrification polar which depends on the polar of the second polar group 621. Furthermore, the encapsulated mother particle 5 has the number of the second polar group 621, the valence of the second polar group 621 in the second polymerizable surfactant 62, the molecular weight of the second polymerizable surfactant 62 and the charge which is the amount of electrification that depends on the additive amount of the second polymerizable surfactant 62.

Here, in the polymerization reaction described above, one kind or two kinds or more of each polymerizable surfactant described above, a hydrophobic monomer, a cross-linked monomer, a compound represented by the general formula (1) described above and other well-known polymerization monomers may be respectively used.

In addition, since the emulsion polymerization reaction is conducted using an ionic polymerizable surfactant, in many cases, the status of emulsion of a mixed solution including raw material monomers is good without using an emulsifying agent. Therefore, it is not necessary to use the emulsifying agent, however at least one kind selected from a group consisting of well-known anionic-based, non-ionic-based and cationic-based emulsifying agent may be used as necessary.

Below, description will be given of one example of the possible dispersion status of the polymerizable surfactant in a case of using titanium oxide particles treated by Si as a mother particle 2, using a polymerizable surfactant in the formula (31b) as a polymerizable surfactant 61 and 62 and using a dispersion medium in which hydrogen chloride is dissolved in water (hydrochloric acid) as a dispersion medium of an aqueous dispersion 90 based on FIG. 6 and FIG. 7.

FIG. 6 is a partially enlarged view showing a dispersion status of the particles which may occur in an aqueous dispersion in FIG. 3C and FIG. 7 is a partially enlarged view showing a configuration of an encapsulated mother particle in FIG. 3D.

The mother particle 2 shown in FIG. 6 includes a raw material mother particle 2a configured by titanium oxide and silicon oxide ($SiO_2$) layer 2b which covers the surface of this raw material mother particle 2a. Further, an O (oxygen) atom which is bonded with a Si atom of silicon oxide and a H (hydrogen) atom which is covalentiy bonded to the oxygen atom, in other words, a hydroxyl group (—OH) are exposed on the surface of the silicon oxide layer 2b.

Further, the polymerizable surfactant 61 and 62 include the polar group 611 and 621, the hydrophobic group 612 and 622, and the polymerizable group 613 and 623.

In addition, here, the chemical formula of the polymerizable surfactant shown in the formula (31b) is represented as $XSO_3Na$ to be simplified. However, X indicates the part of carbon hydride except. $SO_3Na$.

When the mother particle 2, and the polymerizable surfactant 61 and 62 are added into a dispersion medium of the aqueous dispersion 90,

$$HCl+H_2O \rightarrow H_3O^+ +Cl^- \qquad (a)$$

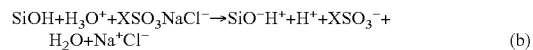

$$SiOH+H_3O^+ +XSO_3NaCl^- \rightarrow SiO^-H^+ +H^+ +XSO_3^- + H_2O+Na^+Cl^- \qquad (b)$$

of the reactions occur and the generated $H^+$ (proton) is coordinately bonded with an O atom of a hydroxyl group which has been bonded with a Si atom of silicon oxide. The surface of the mother particle 2 gains the positive charge 64 due to this proton and an H atom in a hydroxyl group.

In addition, $XSO_3Na$ is ionized in the aqueous dispersion 90 to generate a sulfonate group (the first polar-group 611). This sulfonate group and the positive charge 64 are oriented to be facing due to the electrostatic force.

Furthermore, between a plurality of adjacent alkyl phenyl groups (the hydrophobic group 612) are agglutinated to each other.

According to the behaviours of such each group, the polymerizable surfactant 61 is oriented so as to cover the surface of the mother particle 2 and ion coupled pairs are formed.

Further, another polymerizable surfactant 62 (the second polymerizable surfactant) having the hydrophobic group 622 is oriented so as to be facing the hydrophobic group 612 and the hydrophobic group 622 on the outside of an alkyl phenyl group (the hydrophobic group 612) of the polymerizable surfactant 61 (the first polymerizable surfactant) in which the ion coupled pairs have been formed. In this manner, a micelle like structure as shown in FIG. 6 is formed.

When the polymeric initiator is added into the aqueous dispersion 90 of such a dispersion status, the polymerization reaction occurs between the polymerizable group 613 and 623 which are included in a plurality of each adjacent polymerizable surfactant 61 and 62.

Here, description in detail will be given of the above polymerization reaction as an example of a case where ammonium persulphate is used as a polymeric initiator.

When ammonium persulphate is added into the aqueous dispersion 90, O—O (oxygen-oxygen) in ammonium persulfate is broken to become a radical. This radical reacts with one of two covalent electron pairs which become π electrons of each vinyl group (the polymerizable group 613 and 623) in the polymerizable surfactant 61 and 62. In this manner, the other π electrons become unpaired electron and become radicals. By these radicals reacting with π electrons of an adjacent vinyl group, a new radical is generated and a cross-linked structure between the polymerizable surfactant 61 and 62 is formed. By proceeding such a chain reaction, each vinyl group is polymerized and the shell 31 configured by an organic polymer so as to surround (cover) the surface of the mother particle 2 is formed as shown in FIG. 7. In this manner, an encapsulated mother particle 5 is obtained.

[5] Next, a polymerization initiating group-containing compound 33 having a functional group Z having reactive property with the second polar group 621 and a polymerization initiating group A into the aqueous dispersion 90 is added to mix as shown in FIG. 3D. In this manner, by reacting with the second polar group 621 and the functional group Z, the polymerization initiating group-containing compound 33 as shown in FIG. 3E is linked onto the surface of the shell 31 (the encapsulated mother particle 5). That is, the polymerization initiating group A is introduced onto the surface of the encapsulated mother particle 5.

The polymerization initiating group-containing compound 33 comes to be bonded a polymer 32 which is formed by setting the polymerization initiating group A as the starting point to polymerize a monomer in the next process [6]. Therefore, the polymerization initiating group-containing compound 33 having the polymerization initiating group A functions as a connection unit which connects (links) between the shell 31 and the polymer 32.

Here, in this process [5], types of the functional group Z, in other words, types of the polymerization initiating group-containing compound 33 are selected depending on types of the second polar group 621 which is provided in the shell 31.

Below, description will foe given of types of the polymerization initiating group-containing compound 33 selected depending on types of the second polar group 621 and, at that time, a method in which the polymerization initiating group-containing compound 33 is linked to the shell 31 in order.

Carboxylate Anionic group

In a case where the second polar group 621 which is included in the second polymerizable surfactant 62 is a carboxylate anionic group, the polymerization initiating group-containing compound 33 provided a hydroxyl group or an amino group is selected as a functional group Z. In this manner, it is possible to reliably link between the second polar group 621 and the functional group Z which is included in the polymerization initiating group-containing compound 33.

In addition, as the following chemical formula A, the polymerization initiating group-containing compound 33 is linked to the shell 31.

That is, before linking of the polymerization initiating group-containing compound 33 to the shell 31, a carboxylate anionic group is treated by halogenations or acid anhydrization.

Next, in a case where the functional group Z is a hydroxyl group, ester bonds are formed between the second polar group 621 and the polymerization initiating group-containing compound 33 and in a case where the functional group Z is an amino group, amide bonds are formed between the second polar group 621 and the polymerization initiating group-containing compound 33. As a result, the polymerization initiating group-containing compound 33 becomes linked to the shell 31.

[A]

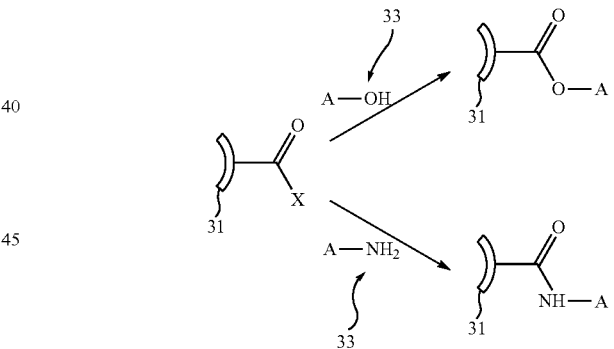

[In the formula, X represents a haloqen group such as Cl, Br, I or acid anhydride such as OCOR' (R' is an alkyl group).]

Sulfonate Anionic group

In a case where the second polar group 621 which is included in the second polymerizable surfactant 62 is a sulfonate anionic group, the polymerization initiating group-containing compound 33 provided with a hydroxyl group or an amino group is selected as a functional group Z. In this manner, it is possible to reliably link the second polar group 621 and the functional group Z which is included in the polymerization initiating group-containing compound 33.

In addition, as the following chemical formula B, the polymerization initiating group-containing compound 33 is linked to the shell 31.

That is, before linking of the polymerization initiating group-containing compound 33 to the shell 31, a sulfonate anionic group is treated by halogenations or acid anhydrization.

Next, in a case where the functional group Z is a hydroxyl group, sulfuric acid ester bonds are formed between the second polar group 621 and the polymerization initiating group-containing compound 33 and in a case where the functional group Z is an amino group, sulfuric acid amide bonds are formed between the second polar group 621 and the polymerization initiating group-containing compound 33. As a result, the polymerization initiating group-containing compound 33 becomes linked to the shell 31.

[B]

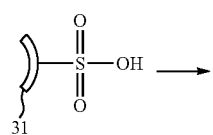

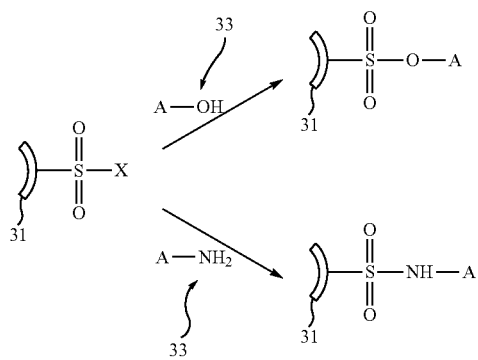

[In the formula, X represents a halogen group such as Cl, Br, I or acid anhydride such as OCOR' (R' is an alkyl group).]

Phosphate Anionic group

In a case where the second polar group 621 which is included in the second polymerizable surfactant 62 is a phosphate anionic group, the polymerization initiating group-containing compound 33 provided a hydroxyl group or an amino group is selected as a functional group Z. In this manner, it is possible to reliably link the second polar group 621 and the functional group Z which is included in the polymerization initiating group-containing compound 33, In addition, as the following chemical formula C, the polymerization initiating group-containing compound 33 is linked to the shell 31.

That is, before linking of. the polymerization initiating group-containing compound 33 to the shell 31, a phosphate anionic group is treated by halogenations or acid anhydrization.

Next, in a case where the functional group Z is a hydroxyl group, phosphate ester bonds are formed between the second polar group 621 and the polymerization initiating group-containing compound 33 and in a case where the functional group Z is an amino group, phosphate amide bonds are formed between the second polar group 621 and the polymerization initiating group-containing compound 33. As a result, the polymerization initiating group-containing compound 33 becomes linked to the shell 31.

Here, in a case of accompanying with a hydrolysis reaction between the second polar group 621 and the polymerization initiating group-containing compound 33, the shell 31 is linked to one polymerization initiating group-containing compound 33 and in a case of not accompanying with a hydrolysis reaction, the shell 31 is linked to two polymerization initiating group-containing compounds 33.

[C]

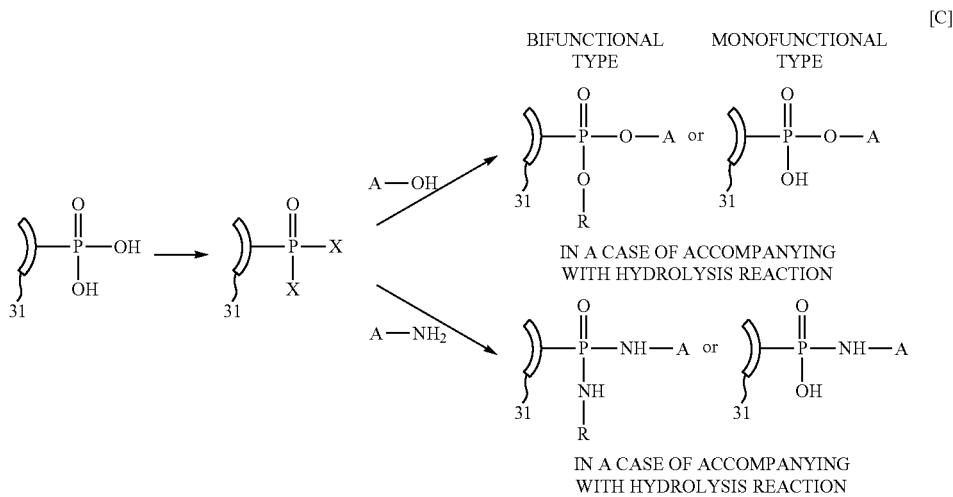

[In the formula, X represents a halogen group such as Cl, Br, I or acid anhydride such as OCOR' (R' is an alkyl group).]

Alkoxide Anionic Group

In a case where the second polar group 621 which is included in the second polymerizable surfactant 62 is an alkoxide anionic group, the polymerization initiating group-containing compound 33 provided a carboxyl group, a sulfonate group or a phosphate group is selected as a functional group Z. In this manner, it is possible to be reliably link the second polar group 621 and the functional group Z which is included in the polymerization initiating group-containing compound 33.

In addition, as the following chemical formula B, the polymerization initiating group-containing compound 33 is linked to the shell 31.

That is, in a case where the functional group Z is a carboxyl group, ester bonds are formed between the second polar group 621 and the polymerization initiating group-containing compound 33, in a case where the functional group Z is a sulfonate group, sulfonate ester bonds are formed between the second polar group 621 and the polymerization initiating group-containing compound 33 and in a case where the functional group Z is a phosphate group, phosphate ester bonds are formed between the second polar group 621 and the polymerization initiating group-containing compound 33. As a result, the polymerization initiating group-containing compound 33 becomes linked to the shell 31.

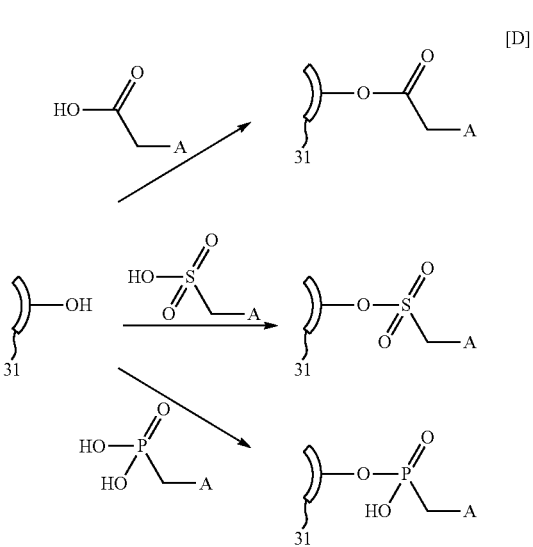

Amino Cationic Group

In a case where the second polar group 621 which is included in the second polymerizable surfactant 62 is an amino cationic group (an amine group), the polymerization initiating group-containing compound 33 provided a carboxyl group, a sulfonate group or a phosphate group is selected as a functional group Z. In this manner, it is possible to reliably link the second polar group 621 and the functional group Z which is included in the polymerization initiating group-containing compound 33.

In addition, as the following chemical formula E, the polymerization initiating group-containing compound 33 is linked to the shell 31.

That is, in a case where the functional group Z is a carboxyl group, amide bonds are formed between the second polar group 621 and the polymerization initiating group-containing compound 33, in a case where the functional group Z is a sulfonate group, sulfonate amide bonds are formed between the second polar group 621 and the polymerization initiating group-containing compound 33 and in a case where the functional group Z is a phosphate group, phosphate amide bonds are formed between the second polar group 621 and the polymerization initiating group-containing compound 33. As a result, the polymerization initiating group-containing compound 33 becomes linked to the shell 31.

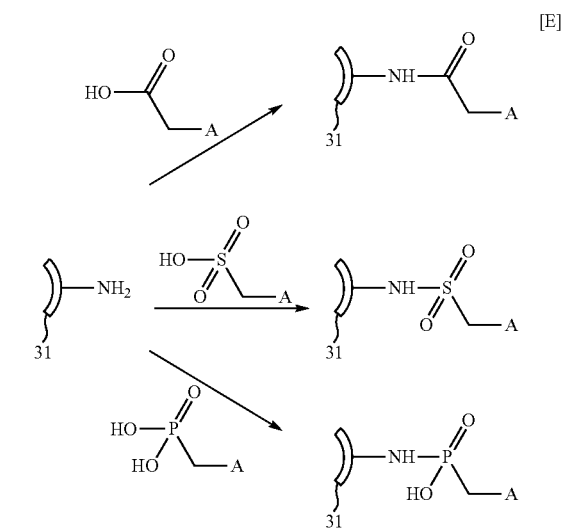

In addition, examples of the polymerization initiating group A which is provided with the polymerization initiating group-containing compound 33, include a polymerization initiating group which is polymerized by atom transfer radical polymerization (ATRP), a polymerization initiating group which is polymerized by nitroxide-mediated polymerization (NMP), a polymerization initiating group which is polymerized by reversible addition fragmentation chain transfer polymerization (RAFT), a polymerization initiating group which is polymerized by organotellurium-mediated living radical polymerization (TERP), or the like, however, among these, a polymerization initiating group which is polymerized by atom transfer radical polymerization is preferable. In this manner, it is possible to process living radical polymerization more effectively in which the polymeric initiator A reacts with the monomer.

Examples of the polymeric initiator group A polymerized by atom transfer radical polymerization include, for example, the polymeric initiators derived from an organic halogen compound and a halogenated sulfonyl compound, and as a polymeric initiator derived from an organic halogen compound, a polymeric initiator provided a benzyl derivative represented by the following general formula (1), a polymeric initiator provided a α-halo ester group represented by the following general formula (2) and a polymeric initiator provided a α-halo amide group represented by the following general formula (3) are included. In addition, as a polymeric initiator derived from a halogenated sulfonyl compound, a polymeric initiator-represented by the following general formula (4) is included.

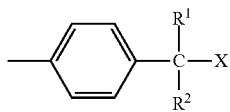

(1)

[In the formula, R¹ and R² each independently represents a hydrogen, X, and a group selected from an alkyl group having 1 to 20 carbon atoms, which arbitrary —CH₂— may be substituted with —O— or a cycloalkylene group and X represents chlorine, bromine and iodine.]

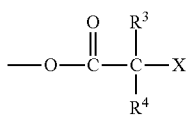

(2)

[In the formula, R³ and R⁴ each independently represents a hydrogen, an alkyl group having 1 to 20 carbon atoms, an aryl group having 6 to 12 carbon atoms or an aryl alkyl group having 7 to 20 carbon atoms and both R³ and R⁴ being a hydrogen is removed. In addition, X represents chlorine, bromine and iodine.]

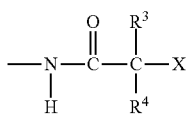

(3)

[In the formula, R³ and R⁴ each independently represents a hydrogen, an alkyl group having 1 to 20 carbon atoms, an aryl group having 6 to 12 carbon atoms or an aryl alkyl group having 7 to 20 carbon atoms and both R³ and R⁴ being a hydrogen is removed. In addition, X represents chlorine, bromine or iodine.]

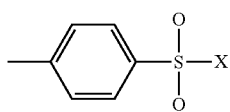

(4)

[In formula, X represents chlorine, bromine and iodine.]

In addition, in the polymerization initiating group-containing compound 33, the functional group Z and the polymerization initiating group A may be directly linked as shown in the chemical formulae A to D, however, may be linked through a linking unit which links between these.

In this case, a linking unit is not particularly limited, however, for example, an alkyl group is included and among these, a linear alkyl group having approximately 1 to 20 carbon atoms is preferable. In this manner, it becomes possible to maintain the clearance between these to appropriate size without affecting the characteristic of the functional group Z and the polymerization initiating group A.

Therefore, such a polymerization initiating group-containing compound 33, for example, may be represented by the following general formula (5).

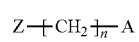

(5)

[In the formula, A represents a polymerization initiating group, Z represents a hydroxyl group or an amino group in a case where the second polar group 621 is a carboxylate anionic group, a sulfonate anionic group or a phosphate anionic group and represents a carboxyl group, a sulfonate group or a phosphate group in a case where the second polar group 621 is an alkoxide anionic group, and n represents an integer of 1 to 20.]

[6] Next, a monomer M and a catalyzer are added into the aqueous dispersion 90 and a polymer 32 is formed by setting the polymer initiator group A which is included in the polymerization initiating group-containing compound 33 as a starting point to polymerize the monomer M using living radical polymerization as shown in FIG. 3E. In this manner, the electrophoresis particle 1 provided the polymer 32 on the surface of the encapsulated mother particle 5 is obtained as shown in FIG. 3D.

As a catalyst, a catalyst which may set a growth terminal as a polymerizable group in the growth process of the polymer 32 or a catalyst in which Lewis acidity is relatively low, is used. Examples of the above catalyst include, for example, a halogenide of a transition metal such as Cu, Fe, Au, Ag, Hg, Pd, Pt, Co, Mn, Ru, Mo and Nb, a transition metal complex in which an organic group such as copper phthalocyanine is oriented as a ligand, or the like, however, among these, a catalyst which sets a halogenide of a transition metal as a major component is preferable.

When the monomer M and the catalyst are added into the aqueous dispersion 90, the polymerization initiating group A comes into contact with the monomer M and the polymerization reaction occurs between them. In addition, the growth terminal always becomes the polymerization initiating group A in the growth process of the polymer 32, and further the polymerization reaction occurs between the polymerization initiating group and the polymerizable group of the monomer and the polymer 32 is synthesised (generated).

Here, in living radical polymerization, since the growth terminal always has polymerization activation in the growth process of polymer, after a monomer is consumed and the polymerization reaction is stopped, the polymerization reaction further proceeds by newly adding a monomer.

Therefore, as a result of adjusting the amount of monomer which is supplied to the reaction system, the reaction time and the amount of catalyst depending on the desired polymerization degree, it is possible to accurately control the number of the structural unit, derived from a monomer which is included in a polymer 32 to be synthesised.

In addition, since it is possible to obtain the polymer 32 in which the distribution of polymerization degree is uniformed, it is possible to set the film thickness of a covering layer 3 which is formed, as a relatively uniform cover layer.

According to this, it is possible to form the polymer 32 having the desired polymerization degree using a simple process while minimizing variability of each electrophoresis particle 1. As a result, the electrophoresis particle 1 starts to have an excellent dispersing ability and a migratory ability in the electrophoresis dispersion liquid described later.

In addition, it. is preferable for the solution (reaction liquid) to conduct a de-acidification process before starting the polymerization reaction. Examples of the de-acidification treatment include, for example, the substitution or the purge treatment after vacuum degassing by inert gases such as argon gas or nitrogen gas, or the like.

In addition, at the time of the polymerisation reaction, by heating up (warming up) the temperature of the solution to the predetermined temperature (the temperature in which a monomer and a catalyzer become active), it is possible to more promptly and reliably conduct the polymerization reaction of monomers.

The temperature of this heat varies slightly depending on types of catalyzer, or the like, but is not particularly limited and is preferably approximately 30 to 100° C. In addition, the duration of the heat, (reaction time) is preferably approximately 10 to 20 hours in a case of setting the temperature of the heat as the range described above.

The electrophoresis particle 1 is manufactured as described above.

[7] Next, the electrophoresis particle 1 is collected from the aqueous dispersion 90 as necessary.

As a method of collecting, various kinds of filtration methods such as ultrafiltration, nanofiltration, microfiltration, cake filtration or reverse osmosis are included and among these, one kind or two kinds or more in combination may be used, however, ultrafiltration in particular is preferably used.

Ultrafiltration is a method which filters fine particles and is the method which is suitably used as the method which filters the electrophoresis particle 1.

[8] Next, the electrophoresis particle 1 is dried as necessary.

The drying of the electrophoresis particle 1, for example, is conducted using various kinds of drying methods such as freeze-drying, through-flow drying, surface drying, fluidized drying, flash drying, spray drying, vacuum drying, infrared ray drying, high frequency drying, ultrasonic drying or pulverized dry, however, using freeze-drying is preferable.

In freeze-drying, it is possible to dry the shell 31 mostly without affecting the original shapes, functions, or the like in the shell 31 which is included in the electrophoresis particle 1 due to the drying by being sublimating the aqueous dispersion 90 from solid to liquid.

Below, description will foe given of a method of freeze-drying the electrophoresis particle 1.

First, the electrophoresis particle 1 which is separated out from the aqueous dispersion 90 by filtration is cooled and frozen. In this manner, the aqueous dispersion 90 included in the electrophoresis particle 1 is changed to solid.

The cooling temperature is not particularly limited as long as cooling temperature is equal to or lower than the temperature which the aqueous dispersion 90 is frozen, approximately −100 to −20° C. is preferable and approximately −80 to −40° C. is more preferable. If the cooling temperature is higher than the range of the temperature described above, there is a case where the aqueous dispersion 90 is unable to be sufficiently solidified. On the other hand, if cooling temperature is lower than the range of the temperature described above, it is not possible to expect the solidification of the aqueous dispersion 90 any more.

Next, the surrounding area of the frozen electrophoresis particle 1 is reduced in pressure. In this manner, the boiling point of the aqueous dispersion 90 is decreased, and therefore, it is possible to sublimate the aqueous dispersion 90.

The pressure during the reduction of pressure varies depending on composition of the aqueous dispersion 90, however, approximately 100 Pa or less is preferable and approximately 10 Pa or less is more preferable. If the pressure during the reduction of pressure is within the range described above, it is possible to reliably sublimate the aqueous dispersion 90.

In addition, since the pressure of the surrounding area of the electrophoresis particle 1 along with the sublimation of the aqueous dispersion 90 is increased, it is preferable to continuously exhaust using a vacuum pump or the like during freeze-drying and maintain a constant level of pressure. In this manner, it is possible to suppress the pressure increase and prevent, decreases in the efficiency of the sublimation of the aqueous dispersion 90.

It is possible to conduct freeze-drying of the electrophoresis particle 1 as described above.

Electrophoresis Dispersion Liquid

Next, description will be given of an electrophoresis dispersion liquid in the invention.

The electrophoresis dispersion liquid is made by dispersing (suspending) at least, one kind of the electrophoresis particle (the electrophoresis particle in the invention) into a dispersion medium (liquid phase dispersion medium).

As a dispersion medium, a dispersion medium having relatively high electric non-conductance is preferably used, and for example, various types of water, alcohols, cellosolves, esters, aliphatic hydrocarbons (liquid paraffin), alicyclic hydrocarbons, aromatic hydrocarbons, halogenated hydrocarbons, aromatic heterocycles, and the like are included and these may be used as a single solvent or may be used as a mixed solvent.

In addition, in the dispersion medium, for example, various kinds of additional agents such as a charge control agent consisting of particles such as an electrolyte, a surfactant agent (anionic or cationic), a metal soap, a resin material, a rubber material, oils, a varnishe or a compound, lubricant, stabilization or various kinds of dyes may be added as necessary.

In addition, the dispersion of the electrophoresis particle into the dispersion medium may be conducted, for example, by one kind or two kinds or more in combination of a paint shaker method, a ball mill method, a media mill method, an ultrasonic dispersion method, a stirring dispersion method or the like.

In such a electrophoresis dispersion liquid, the electrophoresis particle 1 starts to exhibit both excellent dispersion ability and migratory ability due to the action of a polymer 32 which is included in a covering layer 3.

Electrophoresis Display Device

Next, description will be given of an electrophoresis display device (an electrophoresis device in the invention) which applies an electrophoresis sheet in the invention.

Figure 8:
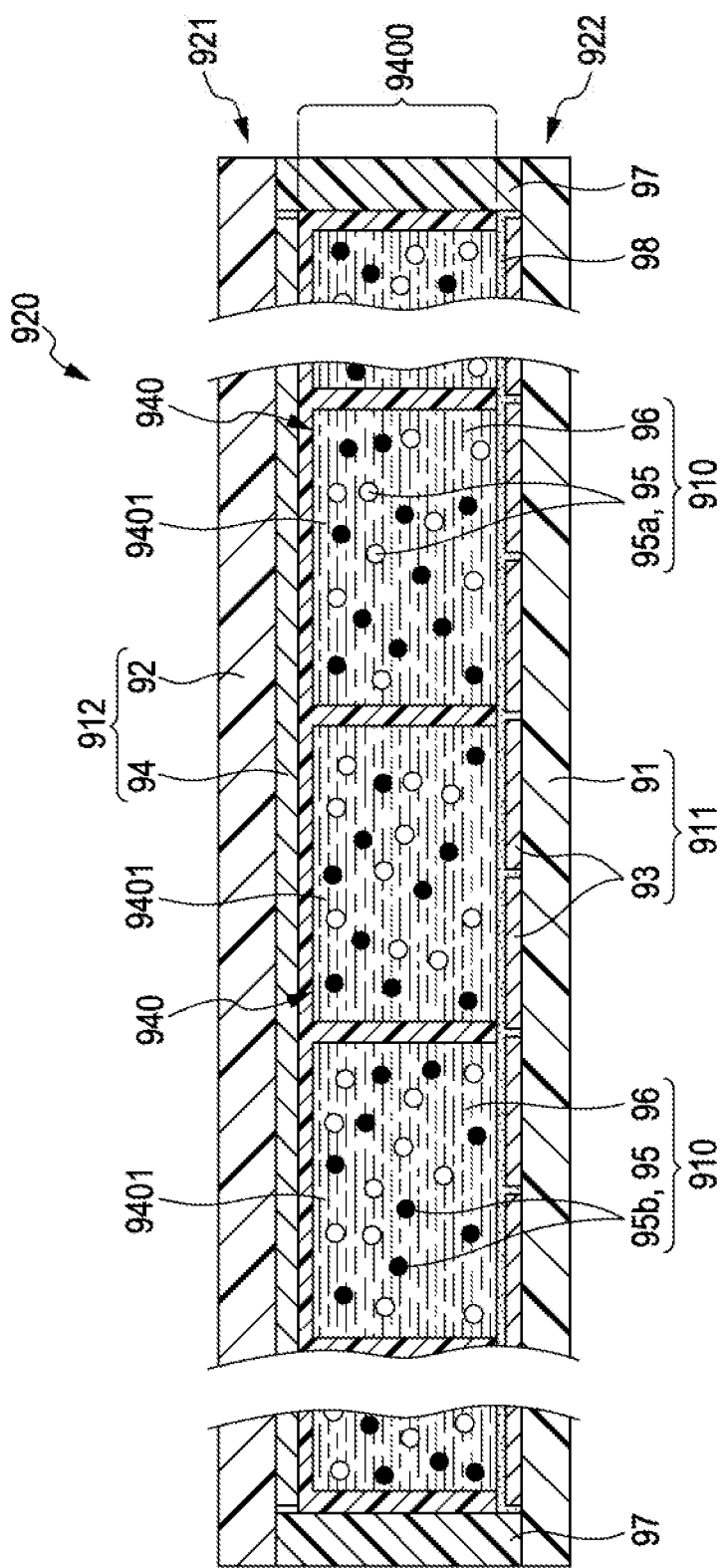
FIG. 8 is a view schematically showing a longitudinal section of an embodiment of an electrophoresis display device.

FIG. 8 is a view schematically showing a longitudinal section of an embodiment of an electrophoresis display device and FIG. 9 is a schematic view showing a working principle of the electrophoresis display device shown in FIG. 8. Here, below, for convenience of explanation, we will describe upper side as "upper" and lower side as "lower" in FIG. 8 and FIG. 9.

The electrophoresis display device 920 shown in FIG. 8 includes an electrophoresis display sheet (frontplane) 921, a circuit substrate (backplane) 922, an adhesive layer 98 which joins the electrophoresis display sheet 921 and the circuit substrate 922 and a sealing unit 97 which hermetically seals the gap between the electrophoresis display sheet 921 and the circuit substrate 922.

The electrophoresis display sheet, (the electrophoresis sheet in the invention) 921 includes a display layer 9400 configured by a substrate 912 provided a tabular type basal unit 92 and the second electrode 94 that, is arranged on the under surface of the basal unit 92, a partition 940 which is arranged on the under surface (other surface) side of the substrate 912 and is formed in a matrix state, and the electrophoresis dispersion liquid 910.

On the other hand, the circuit substrate 922 includes an opposed substrate 911 provided the tabular type basal unit 91 and a plurality of the first electrodes 93 which are arranged on the upper surface of the basal unit 91 and a circuit (not shown) including a switching element, for example, such as TFT provided on the opposed substrate 911 (the basal unit 91).

Below, description will be given of configurations of each unit in order.

The basal unit 91 and the basal unit 92 are respectively configured by a sheet type (tabular type) member and have the functions to support and protect each member which is arranged between these.

Each basal unit 91 and 92 may respectively be either a basal unit having flexibility or an inflexible basal unit, however, a basal unit having flexibility is preferable. By using the basal unit 91 and 92 having flexibility, it is possible to obtain an electrophoresis display device 920 having flexibility, in other words, for example, the useful electrophoresis display device 920 when an electronic paper is created.

In addition, in a case where each basal unit (basis layer) 91 and 92 is set as a basal unit having flexibility, these are preferably configured by a resin material, respectively.

An average thickness of such a basal unit 91 and 92 is arbitrarily set depending on a constituent material, a use, or the like, respectively, and is not particularly limited, however, approximately 20 to 500 μm is preferable and approximately 25 to 250 μm is more preferable.

A first electrode 93 and a second electrode 94 which is the form of laminae (membranal) are respectively arranged on the surface of the partition 940 side of the basal unit 91 and 92, in other words, the upper surface of the basal unit 91 and the lower surface of the basal unit 92.

When the voltage is applied between the first electrode 93 and the second electrode 94, the electric field occurs between these and this electric field acts to the electrophoresis particles 95 (the electrophoresis particles in the invention).

In the embodiment, the second electrode 94 is set as a common electrode, the first electrode 93 is set as a individual electrode (a pixel electrode connected to a switching element) which is divided in a matrix state (in line state), and the part in which the second electrode 94 and one first, electrode 93 are overlapped configures one pixel.

The constituent materials of each electrode 93 and 94 are not particularly limited as long as each has substantially conductivity, respectively.

An average thickness of such an electrode 93 and 94 is arbitrarily set depending on a constituent material, a use, or the like, respectively, and is not particularly limited, however, approximately 0.05 to 10 μm is preferable and approximately 0.05 to 5 μm is more preferable.

Here, among each basal unit 91 and 92 and each electrode 93 and 94, a basal unit and an electrode (the basal 92 and the second electrode 94 in the embodiment) which are arranged on the display surface side are respectively set as a basal unit and an electrode having optical transparency, in other words, as substantially transparent (colorless and transparent, colored and transparent, or translucent).

On the electrophoresis display sheet 921, a display layer 9400 which comes into contact with the lower surface of the second electrode 94 is arranged.

This display layer 9400 is configured by the electrophoresis dispersion liquid (the electrophoresis dispersion liquid in the invention described above) 910 being stored (sealed) inside a plurality of pixel spaces 9401 defined by the partition 940.

The partition 940 is formed so as to divide in a matrix status between the opposed substrate 911 and the substrate 912.

Examples of the constituent material of the partition 940 include, for example, various kinds of resin materials or the like of a thermoplastics resin such as an acrylic-based resin, a urethane-based resin or an olefin-based resin, a thermosetting resin such as an epoxy-based resin, a melamine-based resin or a phenol-based resin, or the like, and among these, one kind or two kinds or more in combination may be used.

The electrophoresis dispersion liquid 910 which is stored in the pixel spaces 9401, in the embodiment, is the electrophoresis dispersion liquid which disperses (suspends) two kinds of a color particle 95b and a white particle 95a (at least one kind of the electrophoresis particle 1) into the dispersion medium 96 and the electrophoresis dispersion liquid in the invention described before is applied.

In such an electrophoresis display device 920, when the voltage is applied between the first, electrode 93 and the second electrode 94, the color particle 95b and the white particle 95a (the electrophoresis particle 1) are electrophoresed toward either electrode according to the electric field occurring between these.

In the embodiment, as a white particle 95a, a white particle having the positive charge is used and as a color particle (a black particle) 95b, a color particle with the negative charge is used. In other words, as a white particle 95a, the electrophoresis particle 1 in which the polymer 32 is charged positively is used and as a color particle 95b, the electrophoresis particle 1 in which the polymer 32 is charged negatively is used.

Figure 9A:
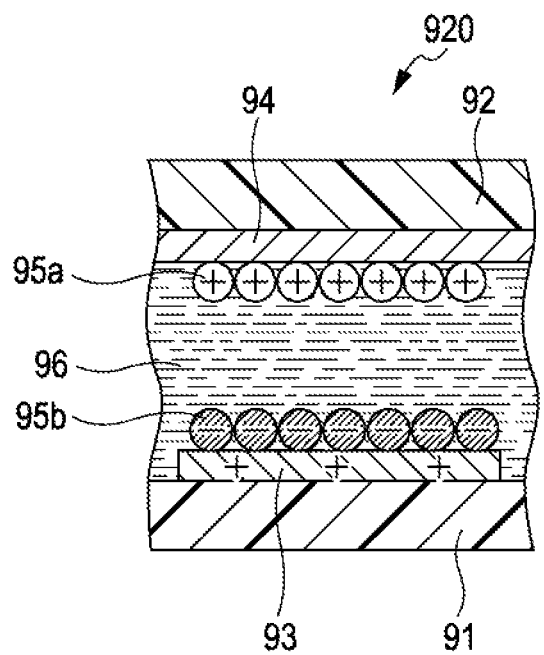
FIGS. 9A and 9B are schematic views showing a working principle of the electrophoresis display device showing in FIG. 8.

In a case of using such an electrophoresis particle 1, when the first electrode 93 is set as electropositive potential, the white particle 95a moves to the second electrode 94 side and gathers at the second electrode 94 as shown in FIG. 9A. On the other hand, the color particle 95b moves to the first electrode 93 side and gathers at the first electrode 93. For this reason, when the electrophoresis display device 920 is seen from above (display surface side), the color of the white particle 95a is able to be seen, in other words, white is able to be seen.

Figure 9B:
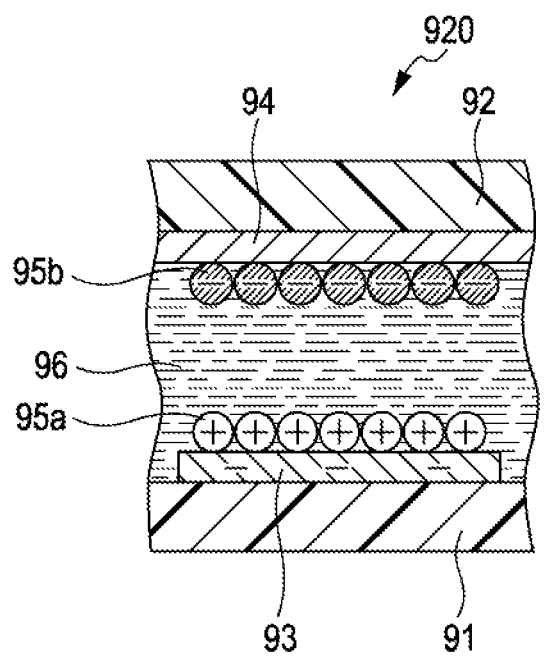

On the contrary, when the first electrode 93 is set as negative potential, the white particle 95a moves to the first electrode 93 side and gathers at the first electrode 93 as shown in FIG. 9B. On the other hand, the color particle 95b moves to the second electrode 94 side and gathers at the second electrode 94. For this reason, when the electrophoresis display device 920 is seen from above (display surface side), the color of the color particle 95b is able to be seen, in other words, black is able to be seen.

In such a configuration, by arbitrarily setting the amount of electrification of the white particle 95a and the color particle 95b (the electrophoresis particle 1), the polar of the electrode 93 or 94, the potential difference between the electrode 93 or 94, or the like, the desired information (image) is displayed on the display surface side of the electrophoresis display device 920 according to the color combination of the white particle 95a and the color particle 95b, the number of particles gathered at the electrode 93 and 94, or the like.

In addition, the specific gravity of the electrophoresis particle 1 is preferably set almost the same as specific gravity of the dispersion medium 96. In this manner, even after the voltage impression is stopped between the electrode 93 and 94, it is possible for the electrophoresis particle 1 to remain for a long period at a fixed position in the dispersion medium

96. That is, information displayed on the electrophoresis display device 920 is maintained for a long period.

Here, an average particle diameter of the electrophoresis particle 1 is preferably approximately 0.1 to 10 μm and is more preferably approximately 0.1 to 7.5 μm. An average particle diameter of the electrophoresis particle 1 is set as the range described above, it is possible to reliably prevent the agglutination between the electrophoresis particle 1 and the sedimentation in the dispersion medium 96 and as a result, it is possible to suitably prevent the deterioration of the display quality of the electrophoresis display device 920.

In the embodiment, the electrophoresis display sheet 921 and the circuit substrate 922 are joined through the adhesive layer 98. In this manner, it is possible to more reliably fix the electrophoresis display sheet 921 and the circuit substrate 922.

An average thickness of the adhesive layer 98 is not particularly limited, however, approximately 1 to 30 μm is preferable, and approximately 5 to 20 μm is more preferable.

A sealing unit 97 is arranged between the basal unit 91 and the basal unit 92 and along with marginal part thereof. Each electrode 93 and 94, the display layer 9400 and the adhesive layer 98 are hermetically sealed by this sealing unit 97. In this manner, it is possible to prevent the water entry into the electrophoresis display device 920 and more reliably prevent the deterioration of display performance of the electrophoresis display device 920.

As a constituent material of the sealing unit 97, the same constituent material included as a constituent material of the partition 940 described above may be used.

Electronic Apparatus

Next, description will be given of an electronic apparatus in the invention.

The electronic apparatus in the invention is provided with the electrophoresis display device 920 as described above.

Electronic Paper

First, description will foe given of an embodiment in a case where an electronic apparatus in the invention is applied to an electronic paper.

Figure 10:
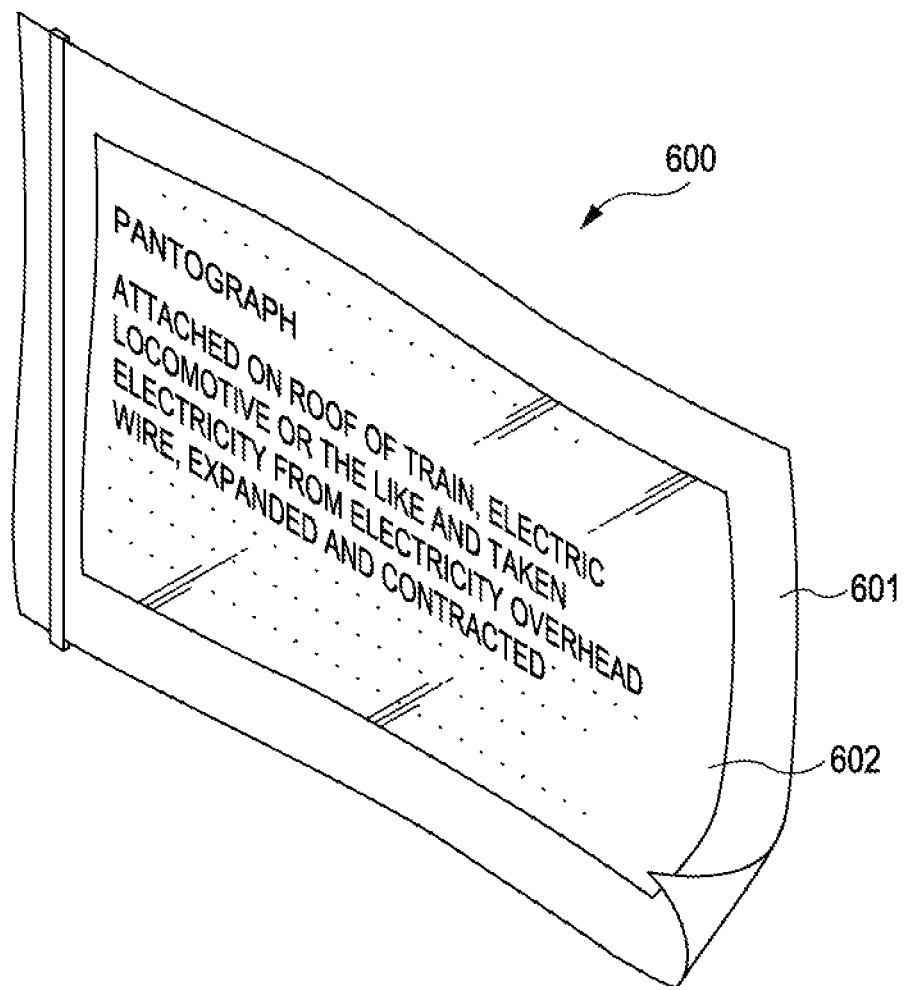
FIG. 10 is a perspective view showing an embodiment in a case of applying an electronic apparatus in the invention to an electronic paper.

FIG. 10 is a perspective view showing an embodiment in a case of applying an electronic apparatus in the invention to an electronic paper.

An electronic paper 600 shown in FIG. 10 is provided with a body 601 which is configured by a rewritable sheet, having texture and bendability as same as papers and a display unit 602.

In such an electronic paper 600, the display unit 602 is configured by the electrophoresis display device 920 as described above.

Display

Next, description will be given of an embodiment in a case where an electronic apparatus in the invention is applied to a display.

Figure 11A:
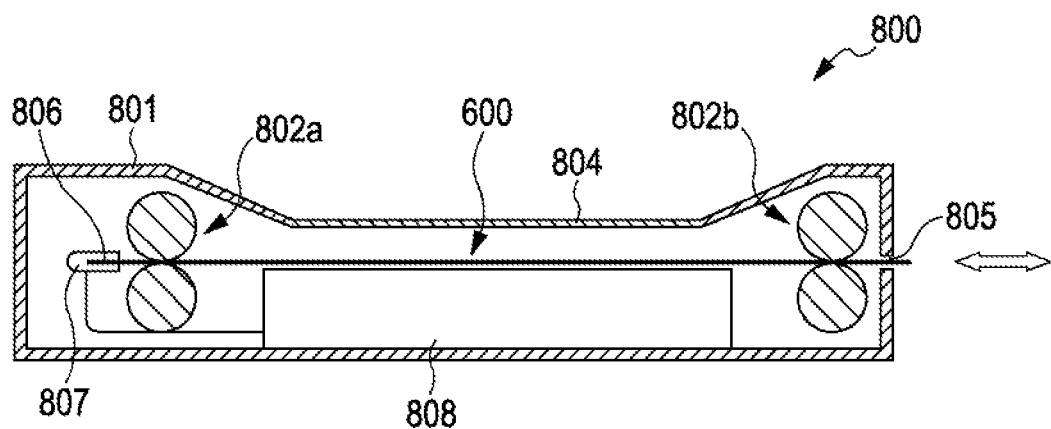
FIGS. 11A and 11B are views showing an embodiment in a case of applying electronic apparatus in the invention to a display.
Figure 11B:
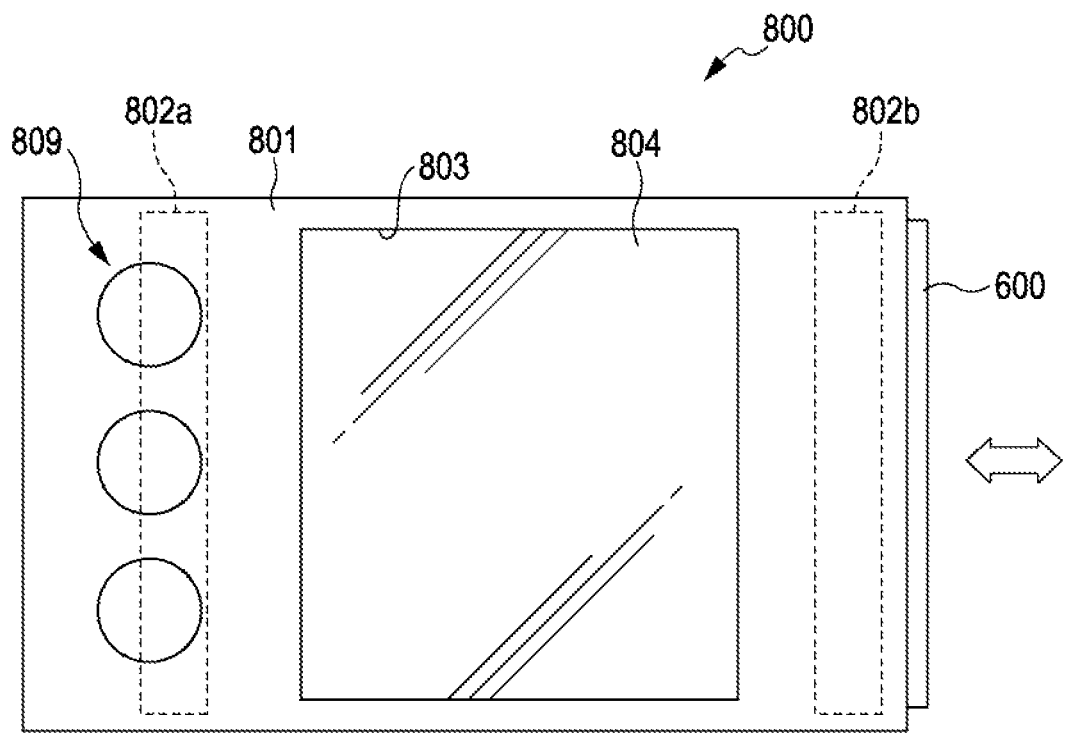

FIG. 11 is a view showing an embodiment in a case of applying an electronic apparatus in the invention to a display. Among these, A is a sectional view and B is a plan view in FIG. 11.

A display (display device) 800 shown in FIG. 11 is provided with a body unit 301 and an electronic paper 600 which is removably arranged with respect to this body unit 801.

In the body unit 801, an insertion point 805 which is able to insert, the electronic paper 600 into the side part, thereof (in FIG. 11A, right, side) is formed and two sets of transfer roller pair 802a and 302b are arranged the inside. When the electronic paper 600 is inserted into the body unit 801 through the insertion point 805, the electronic paper 600 with the condition sandwiched by the transfer roller pair 802a and 802b is placed in the body unit 801.

In addition, on the display surface side of the body unit 801 (in FIG. 11B, the front side of the paper-surface), a rectangular hole unit 803 is formed and a transparent glass plate 804 is put into this hole unit 803. In this manner, it is possible to visually recognize the electronic paper 600 in the status which is placed in the body unit 801 from the outside of the body unit 801. That is, in this display 800, the display surface is configured by visually recognizing the electronic paper 600 of the status which is placed in the body unit 801 on transparent glass plate 804.

In addition, a terminal unit 806 is arranged at the pointed end of the insertion direction of the electronic paper 600 (in FIG. 11, right side) and a socket 807 connected with the terminal unit 806 in the status in which the electronic paper 600 is placed in the body unit 801 is arranged inside the body unit 301. This socket 807 is electrically connected with a controller 808 and an operation unit 809.

In such a display 800, the electronic paper 600 is removably placed with removable in the body unit 801 and it is also possible to use this in a portable status when removed from the body unit 801.

In addition, in such a display 800, the electrophoresis paper 600 is configured by the electrophoresis display device 920 as described.

Here, the electronic apparatus in the invention is not limited to the application to things as mentioned above, for example, a television, a view finder type and monitor direct-view type video tape recorder, a car navigation device, a pager, an electronic organizer, a calculator, an electronic newspaper, a word processor, a personal computer, a workstation, a video phone, a POS terminal, an apparatus provided a touch panel, or the like may be included and it is possible to apply the electrophoresis display device 920 to the display unit of various kinds of electronic apparatuses thereof.

As mentioned above, description has been given of an electrophoresis particle, a method of manufacturing an electrophoresis particle, an electrophoresis dispersion liquid, an electrophoresis sheet, an electrophoresis device and an electronic apparatus in the invention based on embodiments shown in the views, the invention is not limited thereto and the arbitrary configuration having similar functions may be substituted for the configuration of each unit. In addition, other arbitrary components may be added in the invention.

In addition, in the method of manufacturing the electrophoresis particle in the invention, one or two or more of the arbitrary aimed for process may be added.

EXAMPLE

1. Manufacturing of Electrophoresis Particle

Example 1A

[1] First, titania particles (mother particle: manufactured by ISHIHARA SANGYO KAISHA, LTD., "CR-90") of an average particle diameter of 0.3 μm were dispersed in water (aqueous dispersion) to obtain the dispersion liquid. Here, the surface of titania particles was charged positively.

[2] Next, an anionic polymerizable surfactant (first polymerizable surfactant) which is represented by the following chemical formula (38) was added to this dispersion liquid and mixed along with irradiating with ultrasonic waves to obtain a mixed solution.

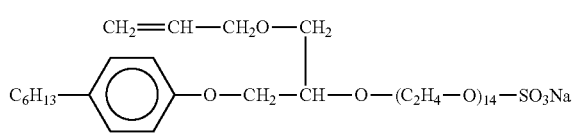

(38)

[3] Next, diallyldimethylammonium chloride salt (second cationic polymerizable surfactant) as an equimolecular amount with respect to an anionic polymerizable surfactant was added to this mixed solution and mixed along with irradiating with ultrasonic waves to obtain an emulsion.

[4] Next, sodium persulfate (polymeric initiator) was added into this emulsion and mixed to obtain a mixed solution including an encapsulated mother particle covered by a shell in which the surround of titania particles is configured by an organic polymer. Here, the conditions at this time was set as temperature: 70° C. and mixing time: 5 hours.

[5] Next, by mixing thoroughly, after a compound (polymerization initiating group-containing compound) which is represented by the following chemical formula (6) was added to this mixed solution to mix, polymerization initiating group-containing compound was bonded on the surface of the encapsulated mother particle.

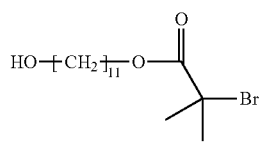

(6)

[6] Next, the particles were collected from the mixed solution by ultrafiltration to be dispersed into IPA (isopropyl alcohol).

[7] Next, by mixing thoroughly after 1 weigh % of methacroylcholine chloride as a cationic monomer and as 5 weigh % of lauryl methacrylate as a non-ionic monomer were poured into this dispersion liquid, the electrophoresis particles were manufactured by forming polymers using ATRP method.

[8] Next, the particles were collected from the mixed solution by ultrafiltration.

[9] Next, the obtained electrophoresis particles were dried by vacuum drying. Here, the conditions for vacuum drying are as follow.

Cooling temperature: 100° C.
Pressure: 3 Pa

Example 2A

In the process [7], the electrophoresis particles were manufactured in the same manner as the Example 1A except that 1 weigh % of carboxymethyl(meth)acrylate which is an anionic monomer was used instead of methacroylcholine chloride which is a cationic monomer.

Example 1B

In the process [1], the electrophoresis particles were manufactured in the same manner as the Example 1A except that an average particle diameter of 0.4 μm of carbon black particles were used instead of titania particles. Here, the surface of carbon black particles was charged negatively.

Example 2B

In the process [7], the electrophoresis particles were manufactured in the same manner as the Example 1B except that 1 weight % of carboxymethyl (meth)acrylate which is an anionic monomer was used instead of methacroylcholine chloride which is a cationic monomer.

2. Evaluation

In regard to the electrophoresis particles which were obtained in each example, zata potential of the surface respectively was measured.

These results are shown in Table 1.

TABLE 1

| | Electrification property of mother particle | Kind of monomer | Zeta potential [mV] |
|---|---|---|---|
| Example 1A | Positive charge | Cationic + Non-ionic | +31 |
| Example 2A | Positive charge | Anionic + Non-ionic | −17 |
| Example 1B | Negative charge | Cationic + Non-ionic | +23 |
| Example 2B | Negative charge | Anionic + Non-ionic | −27 |

As it clear from Table 1, both electrophoresis particles of Example 1A and 1B were charged positively and both electrophoresis particles of Example 2A and 2B were charged negatively.

In addition, in terms of the amount of electrification thereof, Example 1A was about, equal to Example 1B and Example 2A was about equal to Example 2B.

In this manner, by arbitrarily selecting types of monomers used in the process [7], in other words, by arbitrarily selecting types of polymers which are bonded on the surface of the encapsulated mother particle without depending on the electrification property (charge) of the mother particles selected in the process [1], it was found that it was possible to manufacture the electrophoresis particles having the desired electrification polar and the amount of electrification.

The entire disclosure of Japanese Patent-Application No. 2012-086881, filed Apr. 5, 2012 is expressly incorporated by reference herein.

What is claimed is:

1. An electrophoresis particle comprising:
a mother particle; and
a covering layer which covers at least a part of the mother particle,
wherein the covering layer includes a shell formed from an organic polymer and which cellularly engulfs the mother particle and a polymer which is bonded onto an outer surface of the shell, and
the polymer is one that a monomer has been polymerized using living radical polymerization, setting the polymerization initiating group as the starting point.

2. The electrophoresis particle according to claim 1,
wherein the shell forms a network structure which is formed by cross-linking between a plurality of the organic polymers.

3. The electrophoresis particle according to claim 2,
wherein the shell is obtained by adding the first polymerizable surfactant having the first polar group which is the opposite polar to the charge of the surface of the mother particle, a hydrophobic group and a polymerizable group into an aqueous dispersion which disperses the mother particle having the charge on the surface to mix, next adding the second polymerizable surfactant having the second polar group, a hydrophobic group and a polymerizable group to emulsify, and then adding polymeric initiator to occur polymerization reaction.

4. The electrophoresis particle according to claim 1, wherein the monomer includes a non-ionic monomer.

5. The electrophoresis particle according to claim 1, wherein the monomer includes a cationic monomer.

6. The electrophoresis particle according to claim 1, wherein the monomer includes an anionic monomer.

7. An electrophoresis dispersion liquid comprising the electrophoresis particle according to claim 1.

8. An electrophoresis sheet comprising:
a substrate; and
a plurality of the structures which are arranged the above of the substrate and respectively store the electrophoresis dispersion liquid according to claim 7.

9. An electrophoresis device comprising the electrophoresis sheet according to claim 8.

10. An electronic apparatus comprising the electrophoresis device according to claim 9.

11. A method of manufacturing an electrophoresis particle which includes a mother particle and a covering layer which covers at least a part of the mother particle comprising:
dispersing the mother particle having the charge on the surface into an aqueous dispersion;
adding the first polymerizable surfactant having the first polar group which is the opposite polar to the charge of the mother particle, a hydrophobic group and a polymerizable group into the aqueous dispersion to mix;
adding the second polymerizable surfactant having the second polar group, a hydrophobic group and a polymerizable group into the aqueous dispersion to emulsify;
obtaining an encapsulated mother particle which is made by engulfing the mother particle in the form of capsules by a shell formed from an organic polymer by adding polymeric initiator into the aqueous dispersion to cause a polymerization reaction to occur;
linking a polymerization initiating group-containing compound onto the surface of the encapsulated mother particle by adding the polymerization initiating group-containing compound having a functional group having reactive property with the second polar group and a polymerization initiating group into the aqueous dispersion to mix; and
obtaining an electrophoresis particle by adding a monomer and a catalyzer into the aqueous dispersion and forming a polymer on the surface of the encapsulated mother particle.

12. The method of manufacturing an electrophoresis particle according to claim 11,
wherein the second polar group which is included in the second polymerizable surfactant is a carboxylate anionic group, a sulfonate anionic group or phosphate anionic group and a functional group which is included in the polymerization initiating group-containing compound is a hydroxyl group or an amino group.

13. The method of manufacturing an electrophoresis particle according to claim 11,
the second polar group which is included in the second polymerizable surfactant is an alkoxide anionic group and the functional group which is included in the polymerization initiating group-containing compound is a carboxyl group, a sulfonate group or phosphoric group.

14. The method of manufacturing an electrophoresis particle according to claim 11,
the polymer links onto the surface of the encapsulated mother particles to be formed by setting the polymerization initiating group as the starting point to polymerize the monomer using living radical polymerization.

15. The method of manufacturing an electrophoresis particle according to claim 11,
the polymerization initiating group-containing compound is provided with the polymerization initiating group which is polymerized by atom transfer radical polymerization as the polymerization initiating group.

16. An electrophoresis particle manufactured by the method of manufacturing an electrophoresis particle according to claim 11.

* * * * *